US010373279B2

(12) United States Patent
Zaslavsky et al.

(10) Patent No.: US 10,373,279 B2
(45) Date of Patent: Aug. 6, 2019

(54) DYNAMIC KNOWLEDGE LEVEL ADAPTATION OF E-LEARNING DATAGRAPH STRUCTURES

(71) Applicant: MINDOJO LTD., Bitan Aharon (IL)

(72) Inventors: Guy Zaslavsky, Avihail (IL); Andrei Bobkov, Krasnodar (RU)

(73) Assignee: MINDOJO LTD., Bitan Aharon (IL)

( * ) Notice: Subject to any disclaimer, the term of this patent is extended or adjusted under 35 U.S.C. 154(b) by 577 days.

(21) Appl. No.: 14/630,525

(22) Filed: Feb. 24, 2015

(65) Prior Publication Data

US 2015/0243179 A1 Aug. 27, 2015

Related U.S. Application Data

(60) Provisional application No. 61/943,965, filed on Feb. 24, 2014.

(51) Int. Cl.
*G06Q 50/20* (2012.01)
*G06F 16/22* (2019.01)
(Continued)

(52) U.S. Cl.
CPC ......... *G06Q 50/20* (2013.01); *G06F 3/04842* (2013.01); *G06F 16/2228* (2019.01);
(Continued)

(58) Field of Classification Search
CPC ............ G06Q 50/20; G09B 5/00; G09B 7/00
(Continued)

(56) References Cited

U.S. PATENT DOCUMENTS 6,091,930 A 7/2000 Mortimer
6,112,051 A 8/2000 De Almeida
(Continued)

FOREIGN PATENT DOCUMENTS

KR 1020130082697 7/2013
KR 102014019514 2/2014

OTHER PUBLICATIONS

US 5,658,151 A, 08/1997, Roberts (withdrawn)
(Continued)

*Primary Examiner* — Samchuan C Yao
*Assistant Examiner* — Joshua S Luo
(74) *Attorney, Agent, or Firm* — Holzer Patel Drennan

(57) ABSTRACT

Embodiments measure knowledge levels of students with respect to knowledge entities as they proceed through a course datagraph macrostructure, and dynamically adapt aspects of the macrostructure (and/or its embedded microstructures) to optimize knowledge acquisition of the students in accordance with their knowledge level. For example, a course consumption platform can parse the macrostructure and embedded microstructures to identify next microstructures to present to the student in such a way that dynamically adapts knowledge entities of the course to a student as a function of the student's present knowledge level associated with the student and difficulty levels of the presented microstructures. The platform can dynamically compute an updated knowledge level for the student throughout acquisition of the knowledge entity as a function of the student's responses to the microstructures, the student's present knowledge level at the time of the responses, and the difficulty levels of the presented microstructures.

11 Claims, 11 Drawing Sheets

(51) Int. Cl.

| | |
|---|---|
| ***G09B 5/00*** | (2006.01) |
| ***G06N 5/02*** | (2006.01) |
| ***G09B 7/00*** | (2006.01) |
| ***G06F 16/248*** | (2019.01) |
| ***G06F 3/0484*** | (2013.01) |
| ***G09B 7/02*** | (2006.01) |

(52) U.S. Cl.
CPC ........... *G06F 16/248* (2019.01); *G06N 5/022* (2013.01); *G06Q 50/205* (2013.01); *G09B 5/00* (2013.01); *G09B 7/00* (2013.01); *G09B 7/02* (2013.01)

(58) Field of Classification Search
USPC .......................................................... 434/327
See application file for complete search history.

(56) References Cited

U.S. PATENT DOCUMENTS 6,149,441 A 11/2000 Pellegrino
6,287,124 B1 9/2001 Yamaura
6,622,003 B1 9/2003 Denious
6,905,341 B1 6/2005 Whitaker
7,286,793 B1 * 10/2007 Miele ....................... G09B 7/00 434/323
8,128,414 B1 3/2012 Lee
8,515,334 B1 8/2013 Wendkos
8,545,232 B1 * 10/2013 Bardige ................... G09B 7/08 434/322
2002/0042786 A1 4/2002 Scarborough
2002/0049692 A1 4/2002 Venkatram
2002/0169822 A1 11/2002 Packard
2003/0017442 A1 * 1/2003 Tudor ...................... G09B 7/04 434/322
2003/0152906 A1 8/2003 Krebs
2003/0163784 A1 8/2003 Daniel
2004/0018479 A1 1/2004 Pritchard
2004/0063085 A1 * 4/2004 Ivanir ...................... G09B 5/14 434/322
2004/0202987 A1 10/2004 Scheuring
2005/0086188 A1 4/2005 Hillis
2005/0086296 A1 4/2005 Chi
2005/0287209 A1 12/2005 Murphy
2006/0003296 A1 * 1/2006 Dockterman ............ G09B 7/00 434/188
2006/0029920 A1 * 2/2006 Bruno ...................... G09B 7/06 434/323
2006/0127871 A1 6/2006 Grayson
2006/0134593 A1 6/2006 Kalous
2006/0234201 A1 10/2006 Pierson, III
2007/0031801 A1 2/2007 Tidwell-Scheuring
2007/0172810 A1 * 7/2007 McCallum ............... G09B 7/04 434/353
2007/0271202 A1 11/2007 O'Connor
2008/0014569 A1 1/2008 Holiday
2008/0241810 A1 10/2008 Flores
2008/0286737 A1 * 11/2008 Cheng ...................... G09B 7/00 434/322
2009/0049077 A1 2/2009 Lawlor
2009/0311657 A1 12/2009 Dodelson
2010/0005093 A1 1/2010 Heumann
2010/0035225 A1 * 2/2010 Kerfoot, III ............. G09B 7/00 434/335
2010/0088140 A1 4/2010 Gil
2010/0092931 A1 * 4/2010 McCallum ............... G09B 7/04 434/178
2010/0293041 A1 11/2010 Teasdale
2011/0029432 A1 2/2011 Hildred
2011/0039249 A1 * 2/2011 Packard ................... G09B 5/00 434/362
2011/0065082 A1 3/2011 Gal
2011/0137805 A1 6/2011 Brookbanks
2011/0151425 A1 * 6/2011 Smith ...................... G09B 7/00 434/350
2011/0177480 A1 * 7/2011 Menon ..................... G09B 5/00 434/238
2012/0156667 A1 6/2012 Singer
2012/0158639 A1 6/2012 Moore
2012/0308980 A1 * 12/2012 Krauss ..................... G09B 7/02 434/362
2012/0329027 A1 12/2012 Lewolt
2013/0130219 A1 5/2013 Elzinga
2013/0224697 A1 * 8/2013 McCallum ......... G06Q 30/0251 434/178
2013/0224717 A1 8/2013 Thun
2013/0224718 A1 * 8/2013 Woodward ............... G09B 7/00 434/350
2013/0253988 A1 9/2013 Higbie
2013/0288222 A1 * 10/2013 Stacy ....................... G09B 5/00 434/362
2013/0295545 A1 11/2013 Dawley
2014/0038159 A1 2/2014 Rao
2014/0099622 A1 4/2014 Arnold
2014/0134588 A1 * 5/2014 Capone .................... G09B 7/00 434/322
2014/0205990 A1 7/2014 Wellman
2014/0220540 A1 * 8/2014 Burgin ..................... G09B 7/00 434/362
2014/0272889 A1 * 9/2014 Kulkarni .................. G09B 5/08 434/350
2014/0272892 A1 9/2014 Rozycki
2014/0295384 A1 * 10/2014 Nielson ................. G06F 17/275 434/157
2014/0363802 A1 * 12/2014 Hutchinson .............. G09B 5/08 434/350
2015/0017625 A1 1/2015 Yoo
2015/0058336 A1 2/2015 Davis
2015/0072330 A1 * 3/2015 Rosenberg ............... G09B 5/02 434/319
2015/0099254 A1 4/2015 Kamimaeda
2015/0179078 A1 6/2015 Spagnola
2015/0206440 A1 * 7/2015 Aylesworth .............. G09B 5/00 434/362
2015/0206441 A1 7/2015 Brown
2016/0155346 A1 * 6/2016 Wang ..................... G09B 19/00 434/353

OTHER PUBLICATIONS

Matlock-Hetzel, Susan; Basic Concepts in Item and Test Analysis; Jan. 1997; Texas A&M University; http://ericae.net/ft/tamu/Espy.htm.*

Raita Rollande et al. "Graph based framework and its implemented prototype for personalized study planning" In: 2013 Second International Conference on e-Learning and e-Technologies in Education (ICEEE), pp. 137-142 Sep. 25, 2013.

How can I assess group work?, Mar. 3, 2012, Carnegie Mellon University, Reching Excellence & Educational Innovation, https://www.cmu.edu/teaching/designteach/design/instructionastrategies/groupprojects/assess.html Mar. 3, 2012.

IXL, "Teacher's User Guide," copyright 2012, available at http://www.desntonisd.org/cms/lib/tx21000245/centricity/domain/5591/ixluserguide.pdf (accessed Jul. 3, 2018). 2012.

* cited by examiner

DYNAMIC KNOWLEDGE LEVEL ADAPTATION OF E-LEARNING DATAGRAPH STRUCTURES

BACKGROUND

Embodiments relate generally to e-learning systems, and, more particularly, to computer-implemented creation and delivery of adaptive, interactive e-learning courses.

For many years, traditional classrooms have included course materials; teachers to interpret, adapt, and deliver the course materials; and students to learn from the teachers and the course materials. The effective transfer and retention of knowledge in such environments can be improved through increased student engagement and interaction with teachers and course materials, and through increased adaptation by the teachers to the needs and learning styles of the students. However, many pedagogical efforts are frustrated by limitations of traditional classroom environments. For example, it may be difficult or impossible to physically locate students in classrooms with skilled teachers; it may be difficult or impossible for a single teacher to concurrently engage with and adapt to multiple students, particularly when those students have different backgrounds, levels of knowledge, learning styles, etc.; it may be difficult to accurately, or even adequately, measure student knowledge acquisition and retention, or for teachers to adapt their teaching to implicit or explicit student feedback; it may be difficult to dynamically adapt course materials in context of static course materials (e.g., printed textbooks); it may be difficult to measure and respond to teacher or student performance across large (e.g., geographically distributed) populations; it may be difficult to measure or value respective contributions to learning by multiple teachers; etc.

With the increasing ubiquity of computers and Internet access, many attempts have been made to create effective, on-line learning environments. In most instances, these attempts are primarily an on-line implementation of a traditional classroom environment. For example, typical e-learning systems include digital versions of traditional course materials (e.g., digital text and images that mimic those of a traditional, printed textbook), digital self-assessment tools (e.g., digital flash cards, quizzes, etc.), and simple tracking (e.g., quiz scoring, tracking of which lessons have been completed, timers to track time spent, etc.). Some, more recent e-learning systems have added more sophisticated functions. For example, newer digital course materials can include hyperlinks, videos, etc.; and some on-line courses include communications functions to permit live chatting with instructors and/or other students, file access and sharing, etc. A few e-learning systems have recently begun to provide limited types of adaptation. For example, some e-learning courses can offer, or force, a review of a certain concept if a certain amount of time has elapsed since the concept was last presented to the student; or a student can be permitted to select from multiple alternative versions of a course, depending on skill level, prior knowledge, goals, etc. Even with the added capabilities facilitated by computers and the Internet, many of the limitations of traditional classrooms and pedagogical approaches frustrate the efficacy of e-learning systems.

BRIEF SUMMARY

Among other things, systems and methods are described for measuring knowledge levels of students with respect to knowledge entities as they proceed through a course datagraph macrostructure, and to dynamically adapt aspects of the course to optimize knowledge acquisition of the students in accordance with their knowledge level. Embodiments are described in context of e-learning courses created using novel, embedded datagraph structures, including course datagraph macrostructures with embedded lesson datagraph microstructures and practice datagraph microstructures. For example, a course consumption platform can parse the course datagraph macrostructure to identify next practice datagraph microstructures ("practice items") to present to the student in such a way that adapts knowledge entities of the course to each student as a function of a present knowledge level associated with the student and as a function of the respective difficulty levels of multiple available practice datagraph microstructures. The identified next practice item can be presented to the student via the course consumption platform, and response data can be received from the student via in response. The platform can calculate and maintain an updated knowledge level for the student as a function of the student's responses, the student's present knowledge level at the time of the responses, and the difficulty levels of the presented practice items (and/or other response data). Some implementations provide further functionality, including, for example, computing difficulty levels of practice items based on statistical analyses of prior response data, using response data from one knowledge entity to impact knowledge level determinations relating to other related knowledge entities, adapting courses with variant knowledge entities according to student profile information, and others.

According to one set of embodiments, a system is provided for optimizing knowledge acquisition in an e-learning datagraph structure. The system includes a non-transient course data store that stores a course datagraph macrostructure having a knowledge entity embedded therein, the knowledge entity having: a lesson datagraph microstructure having a number of lesson step objects, each linked with at least another of the lesson step objects by a respective lesson edge that defines a lesson flow relationship between the lesson step objects; and a number of practice datagraph microstructures, each assigned a respective difficulty level, and each having a number of practice step objects, each practice step object linked with at least another of the practice step objects by a respective practice edge that defines a practice flow relationship between the practice step objects. The system further includes a set of processors in communication with the course data store that implements a course consumption platform to receive consumption commands from a student, translate the consumption commands to executable datagraph commands, and execute the datagraph commands with the processor to: identify a next practice datagraph microstructure to present to the student as a function of a present knowledge level associated with the student and as a function of the respective difficulty levels of the number of practice datagraph microstructures; receive response data from the student in response to displaying the next practice datagraph microstructure to the student; and calculate an updated knowledge level for the student as a function of the response data, the present knowledge level associated with the student, and the difficulty level of the next practice datagraph microstructure.

According to another set of embodiments, another system is provided for optimizing knowledge acquisition in an e-learning datagraph structure. The system includes: a non-transient course data store that stores a course datagraph macrostructure having a knowledge entity embedded therein, the knowledge entity having: a lesson datagraph microstructure having a number of lesson step objects, each linked with at least another of the lesson step objects by a respective lesson edge that defines a lesson flow relationship between the lesson step objects; and a number of practice datagraph microstructures, each assigned a respective difficulty level, and each having a number of practice step objects, each practice step object linked with at least another of the practice step objects by a respective practice edge that defines a practice flow relationship between the practice step objects. The system also includes: a processor-implemented knowledge entity adaptor that is communicatively coupled with the course data store and that identifies a next practice datagraph microstructure to present to a student via a processor-implemented course consumption platform as a function of a present knowledge level associated with the student and as a function of the respective difficulty levels of the number of practice datagraph microstructures; and a processor-implemented knowledge level estimator that is communicatively coupled with the course data store and that receives response data from the student in response to displaying the next practice datagraph microstructure to the student, and calculates an updated knowledge level for the student as a function of the response data, the present knowledge level associated with the student, and the difficulty level of the next practice datagraph microstructure.

According to another set of embodiments, a method is provided for optimizing knowledge acquisition in an e-learning datagraph structure. The method includes: executing a processor-implemented course consumption platform in a computational environment of a student, the course consumption platform being communicatively coupled with a course data store that stores a course datagraph macrostructure having a knowledge entity embedded therein, the knowledge entity having: a lesson datagraph microstructure having a number of lesson step objects, each linked with at least another of the lesson step objects by a respective lesson edge that defines a lesson flow relationship between the lesson step objects; and a number of practice datagraph microstructures, each assigned a respective difficulty level, and each having a number of practice step objects, each practice step object linked with at least another of the practice step objects by a respective practice edge that defines a practice flow relationship between the practice step objects. The method further includes: identifying a next practice datagraph microstructure to present to the student as a function of a present knowledge level associated with the student and as a function of the respective difficulty levels of the number of practice datagraph microstructures; presenting the next practice datagraph microstructure to the student via a graphical user interface of the course consumption platform; receiving response data from the student via the graphical user interface in response to the presenting; and calculating an updated knowledge level for the student as a function of the response data, the present knowledge level associated with the student, and the difficulty level of the next practice datagraph microstructure.

BRIEF DESCRIPTION OF THE DRAWINGS

The present disclosure is described in conjunction with the appended figures.

Figure 1:
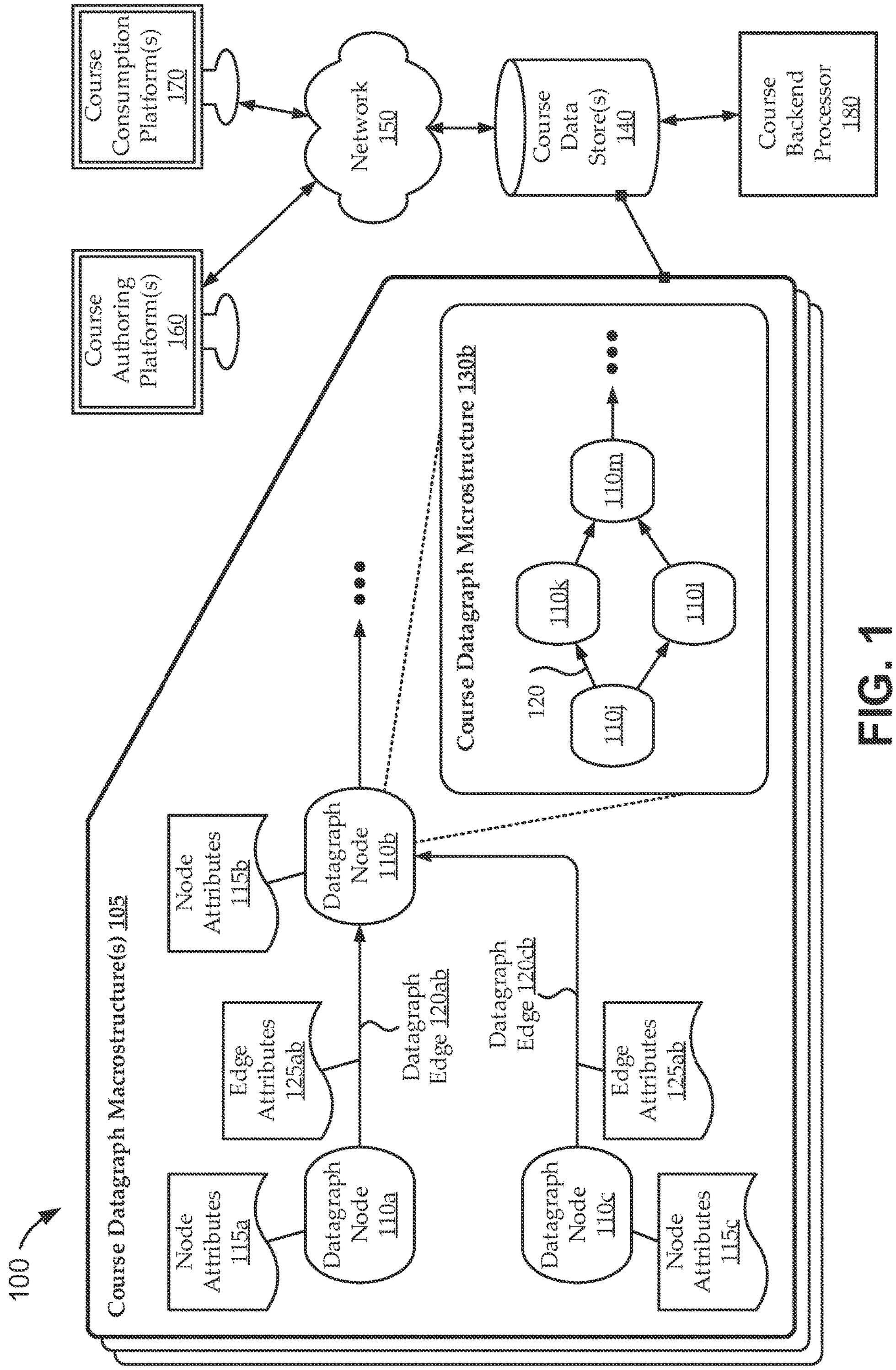
FIG. 1 shows an illustrative e-learning environment, according to various embodiments.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

With the increasing ubiquity of computers and Internet access, many attempts have been made to create effective, on-line learning environments. For example, many traditional e-learning systems provide digital versions of traditional course materials, including digital versions of textbooks, some enhanced with videos, hyperlinks, integrated access to reference materials, on-line help, etc. Some traditional e-learning systems further provide self-practice and self-assessment capabilities, such as digital flashcards, timers, scored tests, and review questions. Some traditional e-learning systems also provide communications functions, such as on-line communities and social networking functions, live chatting with instructors and/or other students, etc. Still, in spite of added capabilities facilitated by computers and the Internet, most traditional e-learning approaches have not strayed for beyond the capabilities of traditional classroom environments. Accordingly, the efficacy of such approaches continues to be hindered by many of the same limitations present in traditional classroom environments. For example, on-line e-learning systems have typically been touted as a way to provide more students with more flexibility as to when and where they can learn (e.g., on-line access to courses can put students in front of teachers, regardless of their geographic separation). However, traditional on-line e-learning systems have done little to address issues, such as facilitating a single teacher's concurrently engagement with and adaptation to multiple students, particularly when those students have different backgrounds, levels of knowledge, learning styles, etc.; accurately, or even adequately, measuring student knowledge acquisition and retention, and facilitating teachers' adapting of their teaching to implicit or explicit student feedback; dynamically adapting course materials to different students and/or other course contexts; measuring and/or responding to teacher or student performance across large (e.g., geographically distributed) populations; measuring and/or valuing respective contributions to learning by multiple teachers; etc.

Among other things, embodiments seek to measure knowledge levels of students with respect to knowledge entities, as they proceed through a course datagraph macrostructure, and to dynamically adapt aspects of the course to optimize knowledge acquisition of the students in accordance with their knowledge level. Embodiments are described in context of e-learning courses created using novel, embedded datagraph structures, including course datagraph macrostructures with embedded lesson datagraph microstructures and practice datagraph microstructures. For example, courses can be defined by nodes and edges of directed graph macrostructures, in which, each node includes one or more directed graph microstructures for defining respective lesson and practice step objects of the courses. The content and attributes of the nodes and edges can adaptively manifest higher level course flow relationships and lower level lesson and practice flow relationships. Various embodiments can exploit such embedded datagraph structures to provide various features, such as facilitation of dynamic course creation and increased course adaptability, improved measurement of student knowledge acquisition and retention, and of student and teacher performance; enhanced monitoring and responsiveness to implicit and explicit student feedback; and access to, exploitation of, measurement of, and/or valuation of respective contributions to learning by multiple teachers, including across multiple courses, disciplines, geographies, etc.; etc.

For the sake of context, FIG. 1 shows an illustrative e-learning environment 100, according to various embodiments. As illustrated, the e-learning environment 100 can include course authoring platforms 160 and course consumption platforms 170 in communication with course data stores 140, for example, over one or more networks 150. Some embodiments further include a course backend processor 180 for performing any backend and/or otherwise centralized functions. For example, in some implementations, some or all datagraph functionality described herein is performed at the course backend processor 180, and the course authoring platforms 160 and course consumption platforms 170 implement thin clients, or the like, to facilitate interaction by course authors and students with the functionality of the course backend processor 180 (e.g., by providing graphical user interfaces, etc.). The course authoring platforms 160, course consumption platforms 170, and course backend processor 180 can be implemented as any suitable computational system, such as a server computer, desktop computer, laptop computer, tablet computer, smart phone, dedicated portable electronic device, etc. The networks 150 can include any suitable communications networks, including wired and/or wireless communications links, secured and/or unsecured communications links, public and/or private networks, mesh networks, peer-to-peer networks, hub and spoke networks, etc. The course data stores 140 can include any suitable types of storage, including one or more dedicated data servers, cloud storage, etc.

While some embodiments are designed to operate in context of typical computing environments, features are embodied in and facilitated by novel datagraph structures that transform the environment into an adaptive e-learning system. As illustrated, the course data stores 140 can store one or more course datagraph macrostructures 105. Each of the course datagraph macrostructures 105 can include one or more embedded course datagraph microstructures 130. Each datagraph structure includes datagraph nodes 110 linked together by datagraph edges 120. Each datagraph node 110 has node attributes 115, and each datagraph edge 120 has edge attributes 125.

As used herein, a "course" generally refers to a set of related "knowledge entities," which can generally include any relatively high-level concepts of the course. Each knowledge entity can include embedded lesson datagraph microstructures, used herein to refer generally to objects that facilitate the acquisition of knowledge relating to particular topics or sub-concepts within the course; and embedded practice datagraph microstructures, used herein to refer generally to objects that facilitate the reinforcement, assessment, and/or refreshment of knowledge relating to particular topics or sub-concepts within the course. For the sake of illustration, a course could be designed to teach basic college writing skills. Each knowledge entity can correspond to a concept, such as "Fundamentals of Good Writing" or "Fundamentals of Critical Thinking and Rhetoric." Within the "Fundamentals of Good Writing" knowledge entity, there may be a number of lesson datagraph microstructures directed, for example, to "Sentence Structure," "Paragraph Structure," or "Essay Organization." There may also be a number of practice datagraph microstructures that may track the lesson datagraph microstructures, and may be directed, for example, to "Practice Sentence Structure"; or they may combine, split, reorganize, parse, or otherwise deviate from the lesson datagraph microstructures, such as "Practice Elements of Sentences" or "Practice Basic Organization in Writing."

In typical embodiments, the course data stores 140 can include large numbers of datagraph nodes 110 created by multiple contributors in association with multiple courses and/or as stand-alone datagraph nodes 110 (e.g., a stand-alone concept, virtual textbook chapter, etc.). A course represents a specific subset of all these datagraph nodes 110, along with all their associated objects (e.g., datagraph edges 120, node attributes 115, edge attributes 125, etc.). Creation of a course, then, can include selection of datagraph nodes 110 and linking of those nodes by datagraph edges 120. In some instances, course creation can further include generation of additional datagraph nodes 110, generation (or adaptation, modification, etc.) of node attributes 115 and/or edge attributes 125, etc. Accordingly, some implementations permit a course to be contained within another course, multiple courses to intersect (i.e., share one or more datagraph nodes 110), etc. Further, proper formulation of the datagraph nodes 110 and datagraph edges 120 as course datagraph macrostructures 105 with embedded course datagraph microstructures 130 can facilitate automatic adaptation, and even generation, of courses for particular contexts. For example, consumption of a course by a student using a course consumption platform 170 can include compilation and consumption of the datagraph nodes 110 and their embedded course datagraph microstructures 130.

The node attributes 115 of the datagraph nodes 110 can be used to express any concrete or abstract aspect of the knowledge domain or of the process for acquiring the knowledge. For example, terms, like "concept" are used herein to generally include any aspects of a knowledge domain, such as factual data, lines of reasoning, learning preferences, proofs, principles, definitions, overviews, rules. "thinking skills" (e.g., how to approach an aspect), "performance skills" (e.g., how to apply an aspect), "work orders" (e.g., tools and techniques for handling multi-stage problems, such as solving a differential equation), contexts (e.g., representing groups of knowledge entities and/or sub-groups of knowledge entities), specific lessons, areas of interest (e.g. "sports", "finance", etc.), mental tendencies (e.g., a tendency to make careless arithmetic calculation mistakes of a certain type, to make certain grammatical errors of a certain type, to jump to certain false conclusions, to misinterpret certain types of data, etc.), misconceptions (e.g., based on societal prejudices, common misunderstandings, perpetuated falsehoods, etc.), thinking styles (e.g. visual thinking or learning, auditory thinking or learning, embodied thinking or learning, etc.), and/or any other aspect of a knowledge domain. Different types of knowledge domains lend themselves to different types of aspects. For example, a course relating to automotive repair will likely rely more heavily on embodied learning, image-based (or video-based) content, step-by-step processes, diagnostic algorithms, etc.; while a course on French literature will likely rely more heavily on visual learning, textual content, critical reasoning, etc.

In some embodiments, the node attributes 115 of the datagraph nodes 110 can include various types of metadata. Some metadata in the node attributes 115 can be used to describe the respective datagraph node 110. For example, the metadata can include a title of the datagraph node 110 (e.g., a long form, a short form, etc. for different contexts), a summary (as described below), a creator identifier (e.g., the name or other identifier of the instructor who created the node), etc. Other metadata in the node attributes 115 can be used to automatically adapt the datagraph node 110 to particular contexts. For example, the metadata can include default and/or adaptive assumptions for types of student profiles, such as certain alternative forms of content of the datagraph node 110 that can be generated based on different styles of learning, different platform capabilities (e.g., different hardware and/or software of the course consumption platform 170), different knowledge levels of particular students (e.g., whether the concept(s) included in the datagraph node 110 are considered new knowledge, a review of prior knowledge, a preview of future knowledge, etc.), different student context (e.g., student age, geography, affiliation, gender, socioeconomics, etc.), etc.

In some embodiments, the node attributes 115 can include a "summary." The summary can be used to automatically generate summaries of the aspects of the respective datagraph nodes 110. In certain implementations, the summary in the node attributes 115 is used to automatically summarize the aspects of a course or lesson at the end of a particular knowledge flow. In other implementations, the summary in the node attributes 115 is used to auto-populate a global or personalized summaries list. For example, the summary can include one or more sets of text populated by a course creator to summarize key concepts covered in a course or a set of lessons. Upon reaching a trigger event (e.g., at the end of a particular lesson or course, at a point in a lesson or course flow specified by the course creator or instructor, when requested by a student (e.g., by pressing a "summarize" button or based on student preferences), after some learning time has elapsed, after some number of concepts has been consumed and/or practiced, after some amount of time has elapsed since last interacting with a particular concept, and/or at any other suitable time), a summary can be generated from the relevant node attributes 115. The summary can include any suitable information, depending on the type of summary and/or when it is being generated. For example, the summary can include a collection of one or more sets of text stored in the node attributes 115 of the group of datagraph nodes 110 being summarized; and/or the summary can include additional monitoring information, such as indications of when a student first consumed a particular concept, when the student apparently understood the concept, when the student last reviewed the concept, how long the student spent learning and/or reviewing the concept, what other concepts are related to a learned concept (e.g., as prerequisites, as similar concepts, as next concepts, etc.), where the student's present knowledge fits into an overall course or learning plan, etc.

As described above, the datagraph nodes 110 are linked by datagraph edges 120, each having edge attributes 125. The datagraph edges 120 can effectively define a "flow relationship" (i.e., an ontological relationship) through a set of datagraph nodes 110. Some portions of the flow relationship can be defined as static. For example, in a static portion of a flow relationship, the flow between certain datagraph nodes 110 is always the same, regardless of the context of the datagraph nodes 110 in a course, lesson plan, etc.; regardless of the type of student; regardless of the student's interaction with the datagraph nodes 110 and/or other datagraph nodes 110; etc. Other portions of the flow relationship can be defined as dynamic. For example, in a dynamic portion of a flow relationship, the flow between certain datagraph nodes 110 is dependent on the context of the datagraph nodes 110 in a course, lesson plan, etc.; dependent on the type of student; dependent on the student's interaction with the datagraph nodes 110 and/or other datagraph nodes 110; etc. In many instances, portions of the flow relationship can be defined as "limited dynamic," or the like. For example, in a limited dynamic portion of a flow relationship, the flow between certain datagraph nodes 110 can be mostly static, except for limited variances that can be triggered by special student context (e.g., falling outside a large predetermined "normal" range, etc.), special learning context (e.g., a datagraph node 110 for a knowledge entity is being consumed outside its originally intended course context, etc.), and/or in other particular cases. Even though each particular datagraph edge 120 may define relationships that do not, themselves define a flow between their source and target nodes, the datagraph edges 120 are still considered as defining a flow relationship at a higher level. For example, certain relationships defined by a datagraph edge 120 (e.g., a variant or special/general case relationship) may define, not how consumption flows from its source to its destination node, but rather which of multiple nodes will be presented to a student during consumption of the datagraph; such that the datagraph edge 120 still helps to define the overall flow relationship among the nodes.

To define such flow relationships, the edge attributes 125 of each datagraph edge 120 can include a type, a source, and a destination. For example, as shown in FIG. 1, the source of datagraph edge 120*ab* is datagraph node 110*a*, and the destination of datagraph edge 120*ab* is datagraph node 110*b*. Its edge attributes 125*ab* can define the type of datagraph edge 120*ab* in a manner that indicates a relationship in the course datagraph macrostructure 105 between datagraph node 110*a* and datagraph node 110*b*.

Figure 2:
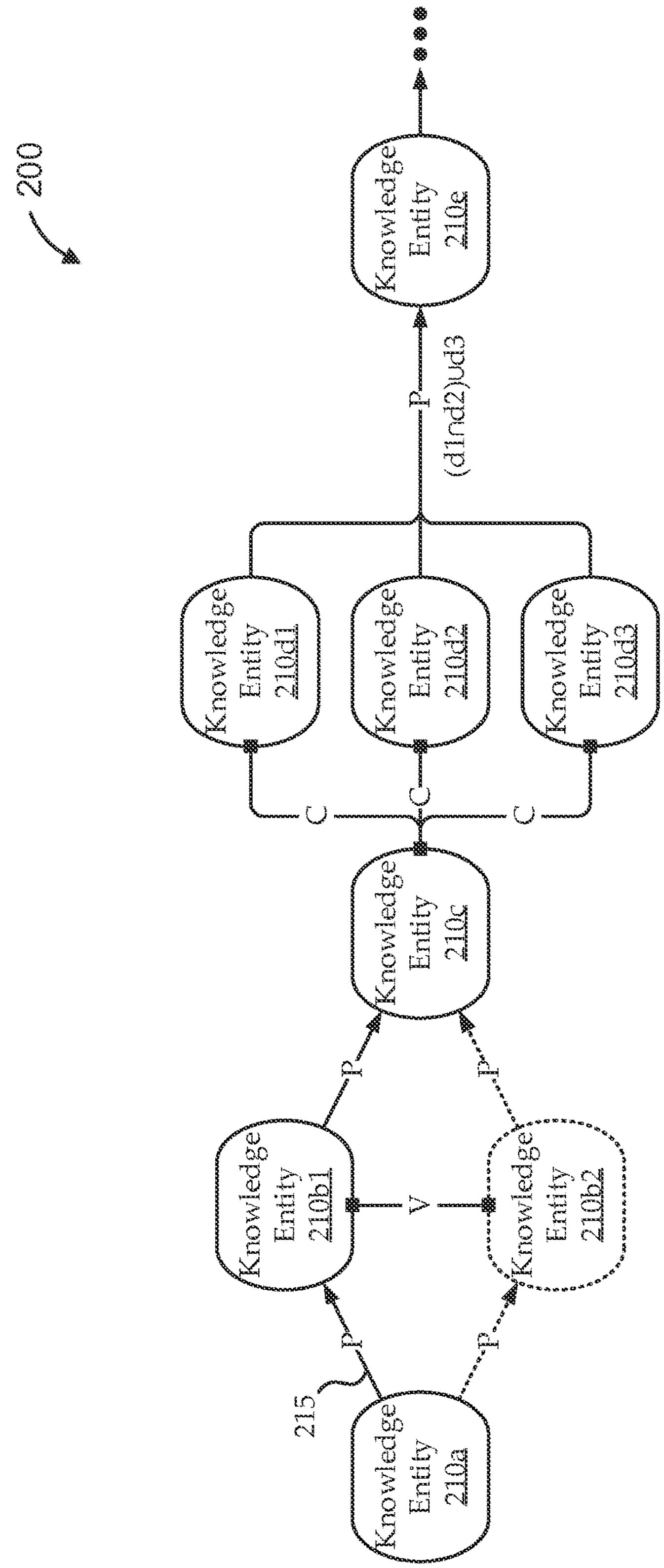
FIG. 2 shows an illustrative course datagraph macrostructure that includes a particular course flow relationship among its knowledge entities, as defined by knowledge edges between those knowledge entities.

FIG. 2 shows an illustrative course datagraph macrostructure 200 that includes a particular course flow relationship among its knowledge entities 210, as defined by knowledge edges 215 between those knowledge entities 210. The course datagraph macrostructure 200, the knowledge entities 210, and the knowledge edges 215 can be implementations of the course datagraph macrostructure 105, the datagraph nodes 110, and the datagraph edges 120 of FIG. 1, respectively. Each knowledge edge 215 is represented as an arrow to indicate its source and destination (i.e., the tail and head of the arrow, respectively), and each arrow is labeled to indicate one of an illustrative set of edge types.

One edge type is a "prerequisite" knowledge edge 215 (labeled as "P"), indicating that the creator of the course flow relationship has required students to consume the source knowledge entity 210 prior to consuming the destination knowledge entity 210 is that knowledge of Entity A is needed to start learning Entity B. In some implementations, the creator of the course flow relationship can define alternative forms of the prerequisite. For example, when the student reaches knowledge entity 210*a*, its node attributes can indicate that knowledge entity 210*a* can be considered consumed as long as the student has either consumed knowledge entity 210*a* or has completed some alternative indication of knowledge of that concept (e.g., previously consumed an alternate knowledge entity 210, correctly answered related questions in a pretest, has authorization to skip the knowledge entity 210 from an instructor, has explicitly indicated prior knowledge of the content of the knowledge entity 210 via a prompt, etc.).

Another edge type is a "component" knowledge edge 215 (labeled as "C"), indicating that the creator of the course flow relationship considers a set of destination knowledge entities 210 as a group of co-concepts falling within a macro-concept of a source knowledge entity 210 (e.g., as a bucket, macro-object, etc.). For a set of component knowledge edges 215 sharing a common source, there may not be a flow (e.g., order) defined between their destination objects, or the flow may be defined by the source ("parent") object. For example, it may not be relevant which of the destination knowledge entities 210 linked by component knowledge edges 215 is consumed first or last, but it may be important that some combination of those knowledge entities 210 is consumed as a prerequisite for consuming a next knowledge entity 210. As illustrated in FIG. 2, knowledge entity 210*c* can be considered as a container object for knowledge entity 210*d*1, knowledge entity 210*d*2, and knowledge entity 210*d*3; and some or all of those knowledge entities 210*d* (e.g., effectively, some defined completion of the "container" knowledge entity 210*c*) can be a prerequisite of knowledge entity 210*e*. In some implementations, the component type of knowledge edge 215 can be used to form complex prerequisites. The complex prerequisites can be defined in any expression form that can be logically parsed, such as using Boolean operators (e.g., "AND," "OR," "∩," etc.), mathematical operators (e.g., "+,"), natural language expressions (e.g., "both x and y, or some combination of x or y with z"), predefined expression formats (e.g., "AND(z, OR(x,y))"), etc. For example, as illustrated, the prerequisite of knowledge entity 210*e* is labeled as "(d1∩d2)∪d3," indicating that the creator of the course flow relationship desires or requires that the student first learn either all the concepts of knowledge entity 210*d*1 and knowledge entity 210*d*2, or all the concepts of knowledge entity 210*d*3.

Another edge type is a "variant" knowledge edge 215 (labeled as "V"), indicating that the creator of the course flow relationship considers two knowledge entities 210 to be variants of each other to be selected according to defined conditions. For example, edge attributes of a variant knowledge edge 215 can determine which of alternative knowledge entities 210 to present to a student according to different styles of learning, different platform capabilities, different knowledge levels of the student, different student context, etc. As illustrated, knowledge entity 210*a* is shown as a prerequisite of knowledge entity 210*b*1 and knowledge entity 210*b*2, shown as variants. Depending on predefined conditions stored in the edge attributes, upon completion of knowledge entity 210*a*, the student will be presented with one of knowledge entity 210*b*1 or knowledge entity 210*b*2. For example, the creator of the course flow relationship desires that the student have certain knowledge going into knowledge entity 210*c*, but that prerequisite knowledge is not presented in knowledge entity 210*a* or knowledge entity 210*b*1. Accordingly, if the student is determined not to already have that prerequisite knowledge, the student may be presented with knowledge entity 210*b*2, which teaches that additional knowledge (as opposed to being presented with knowledge entity 210*b*1 that assumes prior knowledge of that information). As another example, the creator of the course flow relationship believes that students are more likely to grasp certain concepts in context of case studies tailored to their experiences. Accordingly, the creator formulates and selectively presents alternative versions of a knowledge entity based on a determined profile of the student (e.g., gender, age, likes or dislikes, etc.). Any suitable rationale or basis can derive the use of variation knowledge entities 210. While the variations are shown as separate knowledge entities 210, variations can also be implemented within a particular knowledge entity 210. For example, as described above, the node attributes of a knowledge entity 210 can include metadata that defines alternative forms of the knowledge entity 210 (e.g., different content) depending on certain characteristics, or the knowledge edges 215 can define variant knowledge entities 210 to present based on their edge attributes.

Though not shown, other edge types are possible. For example, some implementations include a "general case" knowledge edge 215, indicating that the creator of the course flow relationship considers a source knowledge entity 210 to be a general case of a destination knowledge entity 210 (and/or considers the destination knowledge entity 210 to be a special case of its source knowledge entity 210. For example, it may be understood that a particular concept is best learned through specific cases, so that a student's knowledge of a general concept may be determined by the student's apparent grasp of some quantity of those specific cases illustrating the general concept. Such a general case knowledge edge 215 can be used in multiple ways, for example, as a dynamic type of prerequisite generator, where the dependency is a function of student profile information. For example, a general case knowledge edge 215 can be used to link two knowledge entities 210—one as a general case of a sub-concept and the other as a specific case of the sub-concept—that are not dependent on each other (e.g., neither is a prerequisite of the other, and it is intended for the student to consume both knowledge entities 210 as part of consuming the course). For a student determined to be more of a "deductive" thinker, it can be desirable to present the general case as a prerequisite of the specific case (the student will likely have more success acquiring the general case first and be intuitively inclined to subsequently grasp the specific case); while for a student determined to be more of an "inductive" thinker, it can be desirable to present the specific case as a prerequisite of the general case (the student will likely have more success acquiring the specific case first and be intuitively inclined to subsequently grasp the general case).

In addition to type, source, and destination, the edge attributes can include other metadata that may relate to its type. For example, for a prerequisite knowledge edge 215, the metadata may define a "mastery threshold," indicating a certain level of mastery required by the student in the source knowledge entity 210 before being eligible to start learning the destination knowledge entity 210.

Figure 3:
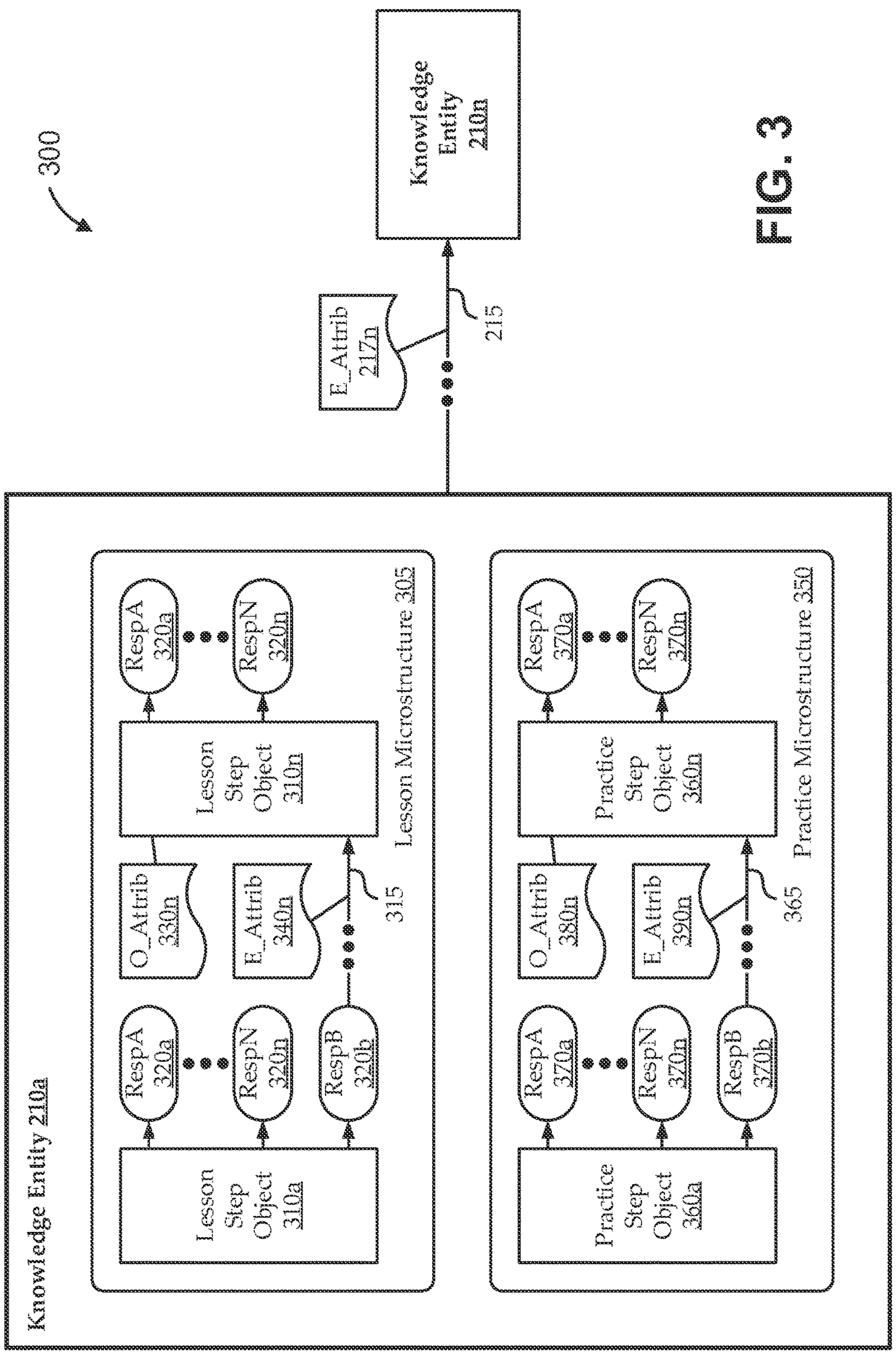
FIG. 3 shows a portion of a course datagraph macrostructure that includes an illustrative lesson datagraph microstructure and an illustrative practice datagraph microstructure embedded in a knowledge entity, according to various embodiments.

As described above with reference to FIG. 1, various functions are facilitated by exploiting novel types of course datagraph macrostructures 105 having course datagraph microstructures 130 embedded therein. FIG. 3 shows a portion of a course datagraph macrostructure 300 that includes an illustrative lesson datagraph microstructure 305 and an illustrative practice datagraph microstructure 350 embedded in a knowledge entity 210, according to various embodiments. The lesson datagraph microstructure 305 and the practice datagraph microstructure 350 can be implementations of the course datagraph microstructure 130 of FIG. 1. In general, each datagraph structure is implemented as a directed graph, which, as described above, includes a set of nodes connected by edges having associated direction. Each course datagraph macrostructure 300 (i.e., and the corresponding macrostructure 105 of FIG. 1 and macrostructure 200 of FIG. 2) is implemented as a directed acyclic graph, which is a directed graph that has no directed cycles (i.e., there is no way to follow a set of edges from a source node and end up back at the source node). In certain instances, the course datagraph macrostructure 300 can manifest various acyclic structures, such as multi-trees, poly-trees, rooted trees, etc. Each datagraph microstructure (e.g., lesson datagraph microstructure 305, practice datagraph microstructure 350, course datagraph microstructures 130 of FIG. 1, etc.) is also implemented as a directed graph, but may or may not be acyclic. For example, some lesson datagraph microstructures 305 loop back on themselves (e.g., depending on student interaction with the lesson step objects, as described below). In a particular knowledge entity 210, the lesson datagraph microstructure 305 and practice datagraph microstructure 350 do not have to manifest the same directed graph structure (e.g., they can have different numbers and types of nodes and/or edges, one can be acyclic when the other is not, etc.).

As illustrated, the lesson datagraph microstructure 305 can include a number of lesson step objects 310 linked together by lesson edges 315. Each lesson step object 310 includes lesson step object attributes 330, and each lesson edge 315 includes lesson edge attributes 340. Each lesson step object 310 can also include a set of (i.e., one or more) associated lesson responses 320. In some embodiments, each lesson step object 310 is linked to one or more other lesson step objects 310 through one or more of its lesson responses 320 via a respective lesson edge 315. Similarly, the practice datagraph microstructure 350 can include a number of practice step objects 360 linked together by practice edges 365. Each practice step object 360 includes practice step object attributes 380, and each practice edge 365 includes practice edge attributes 390. Each practice step object 360 can also include a set of associated practice responses 370. In some embodiments, each practice step object 360 is linked to one or more other practice step objects 360 through one or more of its practice responses 370 via a respective practice edge 365. In some implementations, each lesson datagraph microstructure 305 can effectively represent a particular sub-concept presented via its lesson step objects 310; and each practice datagraph microstructure 350 can effectively represent a practice question, or the like, presented via its practice step objects 360.

For example, the set of lesson responses 320 or practice responses 370 can represent multiple answer choices for a question posed as part of its lesson step object 310 or practice step object 360 (e.g., "The capital of Japan is: (a) Tokyo; (b) Kyoto; (c) Okinawa; or (d) None of the above"), as a prompt posed as part of its lesson step object 310 or practice step object 360 (e.g., "Are you ready to move on?" followed by a selection or text field; or "Click here to continue"), or any other suitable set of responses. Each lesson response 320 or practice response 370 can include any suitable response information, including response content and a response target. For example, the response content can include the text or other information to be presented to the student, and the response target can indicate what should happen if that response is selected by a student. For example, if a student is asked a true/false question having "True" as the correct answer, the lesson responses can show a "True" response and a "False" response to the student (i.e., those are the respective response texts). When the student selects "True," the response target can include an indication of a correct response (e.g., by changing appearance (such as turning green), giving audio feedback (such as playing a chime), or giving other feedback (e.g., showing a special graphic, changing a score, etc.), etc.), and the response target may also automatically proceed to a next lesson step object 310 or practice step object 360 (or provide a second level of responses, such as a selection to proceed to the next lesson step object 310 practice step object 360, or to return to the (or any) previous lesson step object 310 or practice step object 360).

Each practice step object 360 or lesson step object 310 (or their respective practice responses 370 or lesson responses 320) can, in some implementations, be considered as a prompt of the system having static content resources (e.g., text, images, video, interactive animations, etc.) and/or dynamic content resources (e.g., content that adapts to other tags, contexts, etc.). For example, a dynamic content resource can include a special "congratulate" tag that translates in runtime into a specific intensity of congratulating the student for a correct answer depending on a streak of successes or a difficulty level of the question (e.g., "Wow, that's 3 correct answers in a row!! You're amazing!"). Some dynamic content resources include tags. The tags can facilitate conditional content insertions (e.g., a "snippet" to be displayed only on the first event in which the tag gets a rendering request); peripheral instructions (e.g., a feature tooltip to appear on mouse-over, or a countdown-timer to be used for the containing step); etc. Some implementations include a content chunk bank that stores "chunks" that can be inserted (e.g., using tags) to facilitate centralized updating and/or localization or translation. Each object or response can also be associated with metadata. Some such metadata can be used to create Boolean conditions. For example, a lesson step object 310 can be configured as "try again" lesson step object 310, so that there must be at least one "correct" lesson response 320 underneath the lesson step object 310, and any incorrect lesson responses 320 will cause the system to automatically bring the student (after reaching the end of the directed graph path by following the incorrect response) back to the try-again lesson step object 310. Other such metadata can define response style types (e.g., does the step accept free-text, or multiple-choice answers, or a slider, or checkboxes, or a numerical value, etc.). Other such metadata can include correlations to the mental attributes and performance factors; whether a user can expand the set of responses for an object after choosing one of the responses (e.g., for inspecting the other choices, viewing the "path not chosen," etc.); defining whether a particular object is a "root object," meaning it is the beginning of a flow (e.g., within a knowledge entity 210); showing a countdown timer for the object and/or which response should be the implied user choice when the time expires; whether to show an auto-diagnostic menu (e.g., if the user makes a mistake and/or the user gets the next response right); whether to show a time awareness tool for the object; etc. Some implementations permit multiple variations for each lesson step object 310 or practice step object 360, each of which having different associated metadata, in a way that can allow the flow algorithms to choose an optimal step variation per student in a given point in time.

Embodiments of lesson responses 320 and/or practice responses 370 can include any suitable possible choice by a student as a reaction to a particular lesson step object 310 or practice step object 360 prompt. The responses may or may not be limited by an instructor or creator of the response or object. For example, the response may allow for any free-form response, free-form responses only in a particular format, only a selection of a limited range of predetermined options, etc. A lesson response 320 or a practice response 370 can contain any of the types of rich content (e.g., dynamic content resources, metadata, etc.) as that of its lesson step object 310 or practice step object 360. In some implementations, the responses are permitted to have additional functionality to facilitate processing of various response types. For example, a response can include mathematical formulae or computer code (e.g., scripts, etc.) to define and/or carry-out rule sets for matching various user reactions to and/or interactions with the responses and associated objects (e.g., a response may contain code that defines a match if the student enters free-form text indicating any prime number greater than 100). The rich content of the responses can also consider contextual and/or other information separate from the particular student interaction with the response. For example, a response can be accepted as a match if its code determines at runtime that more than two minutes has elapsed since the preceding step was displayed, and no response has been explicitly selected (i.e., a "ran out of time" default can be set to pedagogically focus on timing strategy and solution approach, rather than on the core content). Some examples of response metadata include degree of correctness (e.g., ranging from totally incorrect to fully correct with a spectrum between); matching type (e.g. whether a strict match is required, or whether a free-response step should permit a match with differences in whitespace, punctuation, minor spelling errors, etc.); how to factor in the user's response time and/or confidence level with the correctness to generate an overall performance estimation; how to present the response after it gets clicked (e.g., whether to collapse the set of responses and leave the chosen response visible, to hide all, etc.); whether the response should be navigable as part of the "path not chosen" (e.g., this can be manual or automatic, such as if the subsequent steps are part of a long diagnostic flow and would not make sense for a stand-alone peek; etc.

In general, the lesson step objects 310 are intended to increase a student's level of knowledge of a certain concept, and the practice step objects 360 are intended to develop (e.g., and measure) a student's level of knowledge of a certain concept. For example, while lesson step objects 310 often include questions, review materials, and/or other content that can result in the student "practicing" a particular concept; the primary objective of the lesson step objects 310 is to add to the student's knowledge. Similarly, while a student's interaction with practice step objects 360 can certainly help a student learn underlying concepts, the primary objective of the practice step objects 360 is to further develop the student's understanding of previously seen concepts (e.g., and to measure the student's knowledge level with respect to those concepts). Still, much information about the student can be gleaned by monitoring the student's interaction with both lesson step objects 310 and practice step objects 360. As discussed herein, the embedded datagraph structures allow such monitoring to enhance course adaptations. For example, information gleaned from monitoring student interactions with the lesson step objects 310 can cause adaptations in presentation to that student (and/or to other students) of future lesson step objects 310 and/or adaptations in presentation of practice step objects 360 within that knowledge entity 210, can propagate up to cause adaptations in presentation to that student (and/or to other students) of other microstructures of the knowledge entity 210 and/or in other knowledge entities 210, can further propagate to alter profiles and/or other information relating to that student or other students (e.g., for use in characterizing a student's proclivities, learning style, preferred learning times or apparent attention span, etc.), can be used to measure effectiveness of a particular lesson step objects 310 or course object 360 (e.g., on its own, relative to others in its knowledge entity 210, relative to its course context, relative to alternative approaches to the same or similar concepts, etc.) or effectiveness of a particular contributor (e.g., how the creator of that course or object compares to himself or herself and/or to other contributors, etc.).

Some embodiments include additional functionality for lesson step objects 310 and/or practice step objects 360. For example, practice step objects 360 can be categorized and assigned to "baskets." Each lesson step object 310 or knowledge entity 210 can contain one or more baskets, each having zero or more assigned practice step objects 360. Each basket can represent a difficulty level, learning type, or any other useful categorization. The basket assignment can be implemented at the knowledge entity 210 level (e.g., using the node attributes of knowledge entities 210 or edge attributes 217 of knowledge edges 215), at the object level (e.g., using practice step object attributes 380 or practice edge attributes 365), or using course-level metadata or other metadata. For example, a basket can be implemented as a separate type of object or effectively as the result of attributes of other objects. The baskets can be used, for example, to dynamically and automatically generate a set of appropriate practice step objects 360 according to a student's interactions with related lesson step objects 310 and/or based on other information (e.g., a student's overall measured knowledge level, learning style, time elapsed since last review, etc.).

Figure 4:
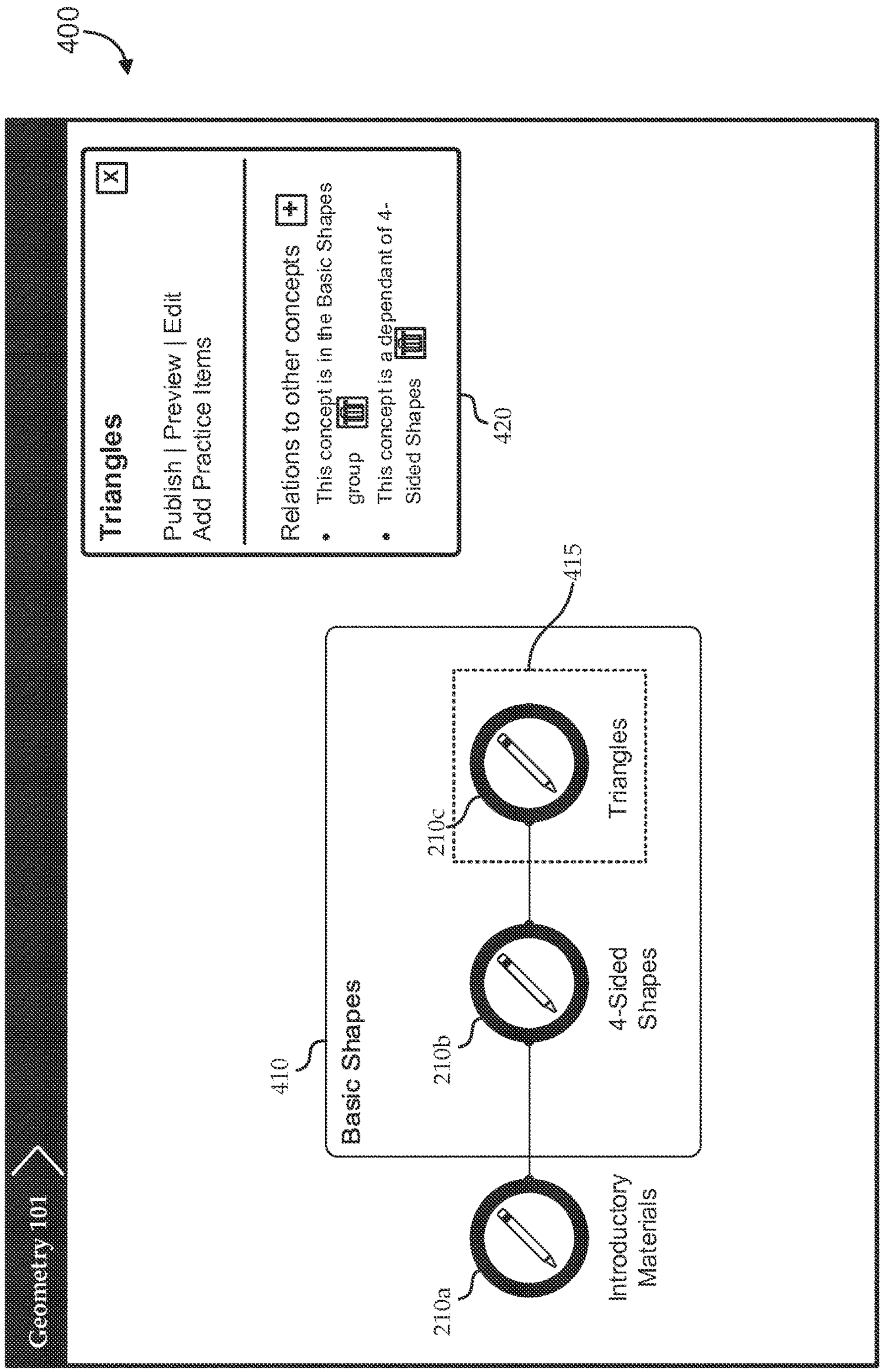
FIG. 4 shows an illustrative screenshot of a course datagraph macrostructure editing environment, according to various embodiments.
Figure 5:
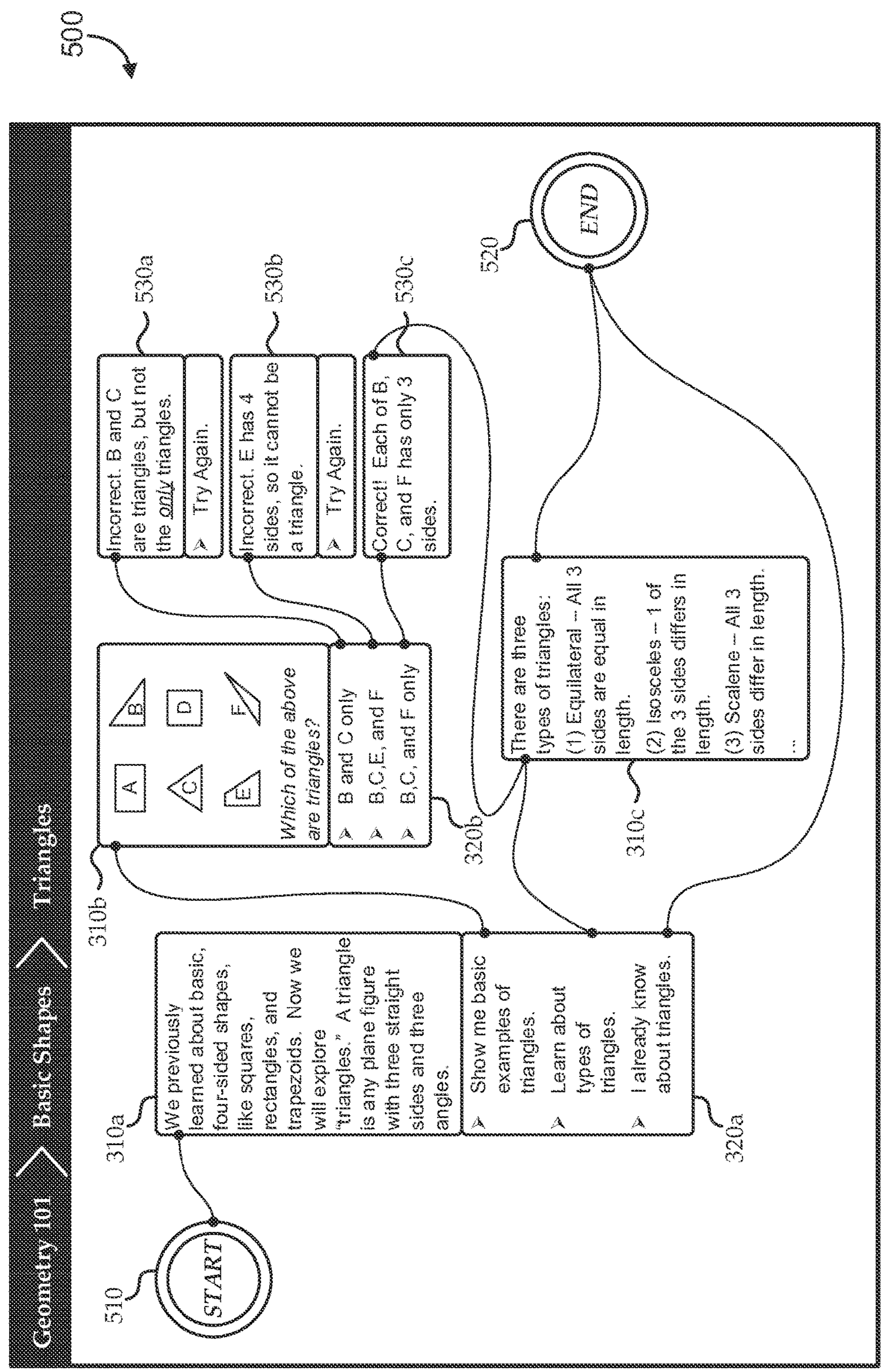
FIG. 5 shows an illustrative screenshot of a lesson datagraph microstructure editing environment, according to various embodiments.

For the sake of illustration, FIGS. 4 and 5 show a portion of an example introductory course on geometry. FIG. 4 shows an illustrative screenshot 400 of a course datagraph macrostructure editing environment, according to various embodiments. The course datagraph macrostructure editing environment can be displayed on a course authoring platform 160, as illustrated in FIG. 1. The particular illustrated course datagraph macrostructure is intended to illustrate certain functionality of a particular implementation and is not intended to be limiting. As shown, the illustrative course datagraph macrostructure includes three knowledge entities 210: "Introductory Shapes"; "4-Sided Shapes"; and "Triangles." The "4-Sided Shapes" and "Triangles" knowledge entities 210 are shown as part of a "Basic Shapes" group 410. Dashed box 415 indicates that a course author has selected the "Triangles" knowledge entity 210*c*.

In response to this selection, a window 420 can populate with information about the selected knowledge entity 210*c*. The window 420 can include any useful controls, information, menus, etc. The illustrated window 420 includes various controls and/or information relating to the knowledge entity 210*c* contents. For example, the window 420 shows controls, including "Publish" for publishing a new or edited version of the knowledge entity 210*c* to the course for visibility by students, "Preview" for allowing the course author to see what a student would see when interacting with that knowledge entity 210*c*, "Edit" for accessing various editing functions for the knowledge entity 210*c* (e.g., including adding lesson step objects to an embedded lesson datagraph microstructure), and "Add Practice Items" for associating the knowledge entity 210*c* with practice step objects in an embedded practice datagraph microstructure. The window 420 can also include controls and information relating to the knowledge edges associated with the knowledge entity 210*c*. For example, the window 420 shows that the knowledge entity 210*c* is "in the Basic Shapes group" and is "a dependant of 4-Sided Shapes" (e.g., the "4-Sided Shapes" knowledge entity 210*b* is a prerequisite to the "Triangles" knowledge entity 210*c*).

FIG. 5 shows an illustrative screenshot 500 of a lesson datagraph microstructure editing environment, according to various embodiments. For example, the lesson datagraph microstructure for the "Triangles" knowledge entity 210*c* is displayed to the course author in response to selecting to edit the "Triangles" knowledge entity 210*c* in the interface shown in FIG. 4. As shown, the lesson datagraph microstructure includes three lesson step objects 310 having associated lesson responses 320, linked together to form a directed graph that defines a lesson flow relationship. Some implementations include a start node 510 and an end node 520 for the lesson datagraph microstructure, for example, to help define the flow relationship and/or to make the flow relationship more intuitive for the author. The particular illustrated lesson datagraph microstructure is intended to illustrate certain functionality of a particular implementation and is not intended to be limiting.

As illustrated, the lesson datagraph microstructure can begin at the start node 510 and proceed to a first lesson step object 310*a*. The lesson step object 310*a* presents certain content (introductory and basic information about triangles) and prompt language, and includes associated lesson responses 320*a*. The lesson responses 320*a* provide the student with three different paths through the lesson: one that is more visual and links to lesson step object 310*b*, one that is more textual and links to lesson step object 310*c*, and one that effectively skips the lesson by linking to the end node 520. Following the link to lesson step object 310*b*, the student is now presented with a set of images of triangles and non-triangles, a prompt, and a set of lesson responses 320*b* relating to the prompt. Two of the three answer choices 530 presented in the lesson responses 320*b* are incorrect, and includes related content and a further interactive prompt to "try again." The third answer choice 530*c* is correct; selecting that choice provides explanatory text and links to a next lesson step object 310*c*. Lesson step object 310*c* teaches more information about triangles and has no associated lesson responses 320. After it is determined that the student has consumed lesson step object 310*c* (e.g., after some time, after the student clicks a "continue" button, or in any suitable manner), the flow relationship can continue to the end node 520 to end the lesson.

Various implementations can permit different types of objects, responses, etc. For example, some implementations can require that every lesson step object 310 includes at least one lesson response 320 (e.g., lesson step object 310*c* would not be allowed in such implementations), Further, some implementations may permit or require objects that are global or external to the datagraph structures. For example, a user interface for course consumption may include various global controls, such as menus, navigation buttons, etc.; and/or course authors may be permitted to set up features in the user interface for course consumption, such as chat windows, file management areas, etc.

While FIG. 5 is described with reference to lesson step objects 310 of a lesson datagraph microstructure, some embodiments can implement practice step objects of a practice datagraph microstructure in a similar or identical fashion. The user interface and its functionality can be substantially the same for either type of datagraph microstructure, except that particular lesson- or practice-related functions can be included. For example, rather than presenting new information to the student as with lesson step objects, the practice step objects are intended to review and test that information.

Figure 6:
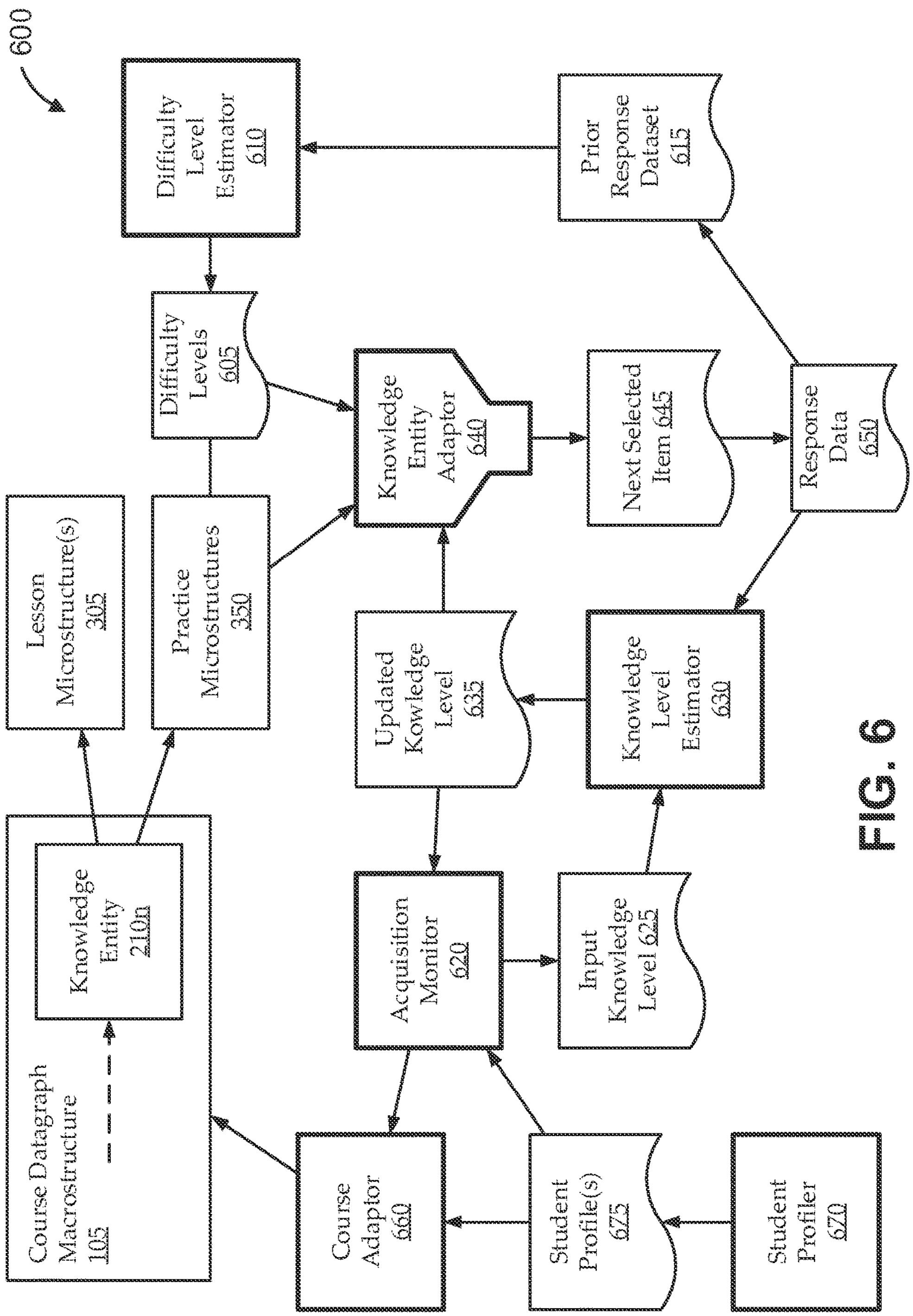
FIG. 6 shows a block diagram of an illustrative course consumption environment that includes a number of processor-implemented blocks for dynamically adapting course consumption to optimize a student's knowledge acquisition, according to various embodiments.

FIG. 6 shows a block diagram of an illustrative course consumption environment 600 that includes a number of processor-implemented blocks for dynamically adapting course consumption to optimize a student's knowledge acquisition, according to various embodiments. The processor-implemented blocks can be used to measure knowledge levels of students with respect to concepts, as they proceed through an e-learning course, and to dynamically adapt aspects of the course to optimize knowledge acquisition of the students in accordance with their knowledge level. As described above, embodiments are described in context of an e-learning course that is implemented as a course datagraph macrostructure 105 having one or more knowledge entities 210, each knowledge entity 210 having one or more lesson datagraph microstructures 305 and one or more practice datagraph microstructures 350 embedded therein.

For example, some embodiments include a non-transient course data store (not shown) that stores a course datagraph macrostructure 105 having a knowledge entity 210 embedded therein. The knowledge entity 210 includes a lesson datagraph microstructure 305 that has a number of lesson step objects, each linked with at least another of the lesson step objects by a respective lesson edge that defines a lesson flow relationship between the lesson step objects. The knowledge entity 210 also includes a plurality of practice datagraph microstructures 350, each assigned a respective difficulty level, and each including a number of practice step objects, each practice step object linked with at least another of the practice step objects by a respective practice edge that defines a practice flow relationship between the practice step objects.

It can be assumed that the knowledge entity 210 is being consumed by a student (e.g., via a graphical user interface of a course consumption platform). Embodiments can include a processor-implemented knowledge entity adaptor 640 that is communicatively coupled (e.g., directly or indirectly)

with the course data store and that identifies a next practice datagraph microstructure (illustrated as next selected item 645) to present to a student (e.g., via a processor-implemented course consumption platform). As described more fully below, the next selected item 645 can be determined as a function of a present knowledge level (e.g., an initial knowledge level or an updated knowledge level 635) associated with the student and as a function of the respective difficulty levels 605 of the practice datagraph microstructures 350. For example, the next selected item 645 can be selected to yield maximum information about the student's knowledge level regarding one or more sub-concepts of the knowledge entity 210.

Some novel functionality described herein adapts how a course is presented to a student based on the student's knowledge level. For example, as described further below, a student can be associated with an initial knowledge level for the knowledge entity 210, and the knowledge level can be impacted by the student's performance during consumption of the knowledge entity 210. Accordingly, some embodiments can include a processor-implemented knowledge level estimator 630 that is communicatively coupled with the course data store and that receives response data 650 from the student in response to displaying the next selected item 645 to the student. The knowledge level estimator 630 can calculate an updated knowledge level 635 for the student (e.g., after the student consumes each practice datagraph microstructure 350, or at any other suitable time) as a function of the response data 650, the present knowledge level associated with the student (i.e., the initial knowledge level, if the first time; or the updated knowledge level 635, if in a further iteration; as described below), and the difficulty level 605 of the next selected item 645. As used herein, the term "response data 650" is intended to include any suitable types of information relating to the content and manner of the student's response. For example, the response data 650 can include the correctness of response (e.g., whether the response is correct, most correct, partially correct, etc.), confidence level (e.g., a slider or other technique can be used to determine the student's confidence in his answer), time to answer the question (e.g., the amount of time the student spent before responding, which may be the amount of time, the amount of time normalized to that student's typical response time, etc.), a number of retries (e.g., if the student attempts the same practice item multiple times), a number of successes or mistakes in a row (e.g., if this is the first correct answer of its type after a string of mistakes, it may be more likely a lucky guess; while it if this is another in a series of correct responses, it may be more likely an intentionally correct answer, etc.), etc.

The initial knowledge level for the knowledge entity 210 can be determined in any suitable manner. For example, the initial knowledge level can be a default value (e.g., 0.5), a median value across a group of students, a median value for the particular student across a group of knowledge entities 210, etc. In one implementation, the initial knowledge level is determined by adjusting a median value according to the student's performance on other knowledge entities 210. For example, a group of knowledge entities 210 can be defined by a course author or implied based on other information (e.g., knowledge edge relationships, metadata, similar textual content in a summary, sharing of one or more practice items between multiple knowledge entities 210, etc.), and the student's performance on one knowledge entity 210 in the group can impact the knowledge level associated with the student for other knowledge entities 210 in the group. In some implementations, a student's prior performance on one knowledge entity 210 in the group can have a forward-looking impact on the initial knowledge level assigned to the student for a not-yet consumed knowledge entity 210 in the group. In certain implementations, a student's present performance on one knowledge entity 210 in the group can have a backward-looking impact on the knowledge level of the student for a previously consumed knowledge entity 210 in the group. For example, poor performance by the student on certain practice datagraph microstructures 350 shared among multiple knowledge entities 210 can indicate that a student has not retained the knowledge acquired from a previously consumed knowledge entity 210. In response to such determinations, embodiments can take any suitable step, such as suggesting or requiring that the student review, or even re-consume, the previously-acquired knowledge entity 210 (or certain portions thereof, alternate versions thereof, etc.); graphically indicating the apparent loss of retention, etc.

Some embodiments can also include a processor-implemented acquisition monitor 620 that tracks the updated knowledge level 635 to determine when the student can be considered to have "acquired" the knowledge entity 210. For example, a student can be considered to have acquired the knowledge entity 210 when the student's updated knowledge level 635 is determined to have reached (or exceeded) a predetermined threshold (e.g., a default threshold for that knowledge entity 210 or for all knowledge entities 210, such as a predetermined "mastery threshold", a value of 0.85, etc.). In some implementations, the acquisition monitor 620 iteratively (i.e., repeatedly) directs the knowledge entity adaptor 640 to identify and present an appropriate next selected item 645, and directs the knowledge level estimator 630 to receive the response data 650 and calculate the updated knowledge level 635, until the knowledge entity 210 is acquired (e.g., until the updated knowledge level 635 for the student reaches a target knowledge level stored in association with the knowledge entity 210).

The knowledge level estimator 630 can calculate the updated knowledge level 635 in any suitable manner. In some implementations, each response to a practice datagraph microstructure 350 can increase or decrease the student's knowledge level by a preset amount (e.g., a fixed amount, a proportional amount, etc.), by a preset amount based on the difficulty level 605 of the next selected item 645, by a preset amount based on the updated knowledge level 635 of the student, etc. Some embodiments of the knowledge level estimator 630 calculates the updated knowledge level 635 for the student in such a way that a magnitude of change between the updated knowledge level 635 and the present knowledge level is inversely related to how closely aligned the difficulty level 605 of the next selected item 645 is with the present knowledge level of the student. For example, when the difficulty level 605 of the next selected item 645 indicates (according to the present knowledge level of the student) that the next selected item 645 should be very difficult for that student, a correct response by the student is likely to be a lucky guess, and an incorrect response by the student is not surprising; so that any response may provide relatively little information about the student's actual knowledge level. Still, if the student correctly answers multiple "too difficult" next selected items 645, this can collectively indicate that the calculated knowledge level for the student is not representative of the student's actual knowledge level. On the other hand, when the difficulty level 605 of the next selected item 645 is closely aligned with the knowledge level of the student (i.e., it appears to be of appropriate difficulty for this student at this time), a correct or incorrect response by the student is likely to be indicative of the student's knowledge of that concept; so that any response may provide relatively a lot of information about the student's actual knowledge level. As such, the magnitude of change between the updated knowledge level 635 and the present knowledge level can be inversely related to how closely aligned the difficulty level 605 of the next selected item 645 is with the present knowledge level of the student (i.e., a response to a next selected item 645 at a more appropriate difficulty level for that student at that time can cause the knowledge level estimator 630 to make a larger change to the value of the student's knowledge level).

Figure 9:
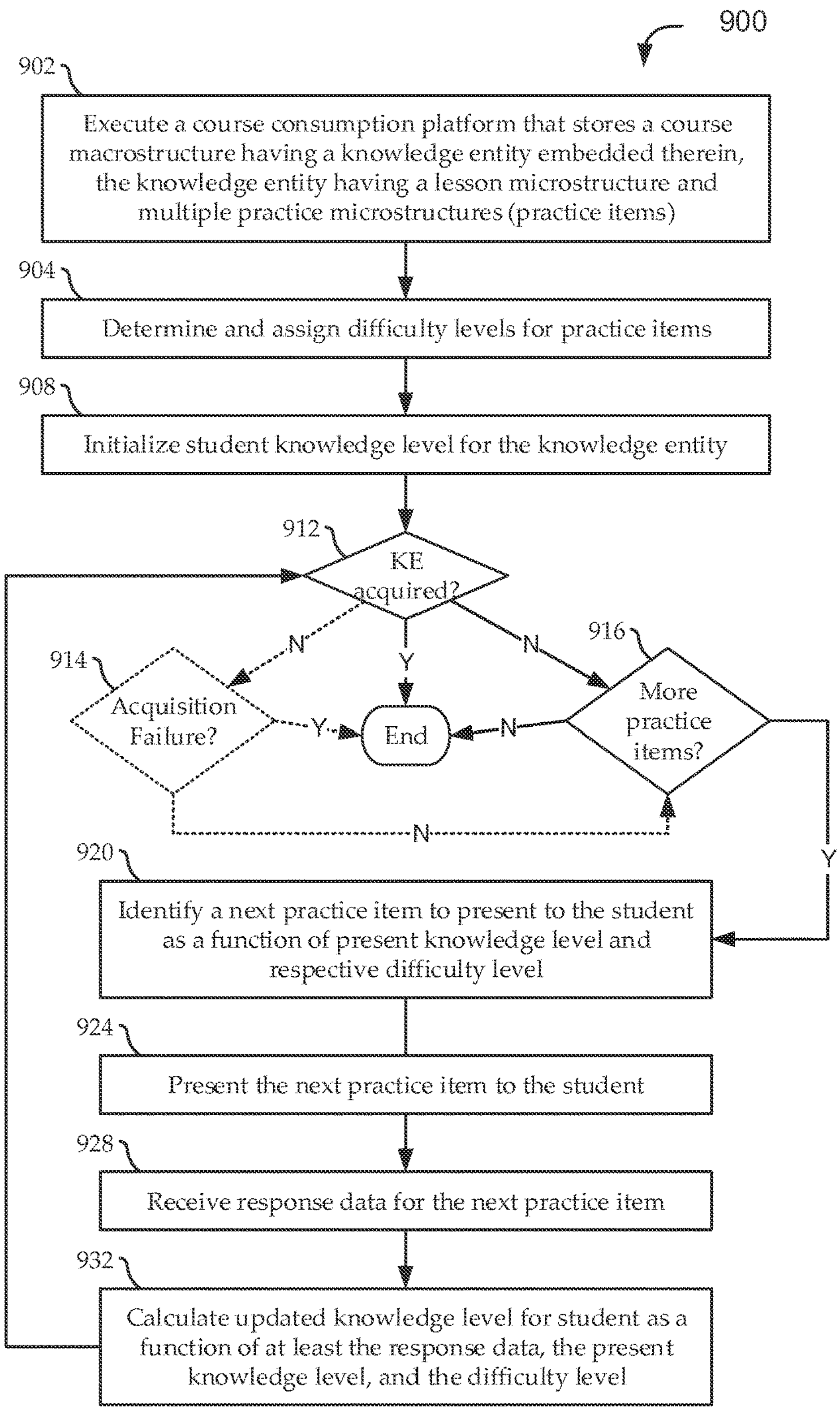
FIG. 9 shows a flow diagram for an illustrative method for optimizing knowledge acquisition in an e-learning datagraph structure, according to various embodiments.

For example, FIG. 9 shows a flow diagram for an illustrative method 900 for optimizing knowledge acquisition in an e-learning datagraph structure, according to various embodiments. Some embodiments of the method 900 begin at stage 902 by executing a processor-implemented course consumption platform in a computational environment of a student. The course consumption platform can be communicatively coupled with a course data store that stores a course datagraph macrostructure having a knowledge entity embedded therein. The knowledge entity can include a lesson datagraph microstructure that has lesson step objects, each linked with at least another of the lesson step objects by a respective lesson edge that defines a lesson flow relationship between the lesson step objects; and can include multiple practice datagraph microstructures ("practice items"), each assigned a respective difficulty level, and each having multiple practice step objects, each practice step object linked with at least another of the practice step objects by a respective practice edge that defines a practice flow relationship between the practice step objects.

Some embodiments determine and assign difficulty levels for the practice items at stage 904. Implementations of stage 904 are described below, for example, with reference to the method 1000 of FIG. 10. Some embodiments initialize the student's knowledge level for the knowledge entity at stage 908, for example, as described above. At stage 912, a determination can be made as to whether the knowledge entity has been acquired. For example, as described above, the acquisition monitor 620 can determine whether the student's updated knowledge level 635 has reached a predetermined threshold level. If so, the method 900 can end. If not, a further determination can be made at stage 916 as to whether more practice items remain for consumption. For example, some embodiments can end, even though the knowledge entity has not yet been acquired, when the student has consumed all of the available practice items (or all of a set of practice items made available to the student). If no more practice items remain, the method 900 can end. As such, some embodiments of the method 900 only continue if the knowledge entity has not yet been acquired and practice items remain for consumption (some other implementations can operate differently, for example, by cycling back through previously presented practice items, or in other ways).

In some embodiments, when it is determined at stage 912 that the knowledge entity has not been acquired, a further determination can be made at stage 914 as to whether there has been an acquisition failure. The acquisition failure can indicate that it is undesirable to keep presenting the student with additional practice items (e.g., the student does not appear to grasp the underlying concepts, and it may be better to return the student to one or more related lesson datagraph microstructures, instruct (or require) the student to repeat the corresponding knowledge entity or a prerequisite knowledge entity, etc. For example, the acquisition monitor 620 can determine whether the student's updated knowledge level 635 has fallen below some minimum threshold level, indicating the acquisition failure.

At stage 920, a next practice item (i.e., a next practice datagraph microstructure) can be identified to present to the student as a function of a present knowledge level associated with the student and as a function of the respective difficulty levels of the plurality of practice items. The identified next practice item can be presented at stage 924 to the student (e.g., via a graphical user interface of the course consumption platform). At stage 928, response data can be received from the student (e.g., via the graphical user interface) in response to the presenting at stage 924. At stage 932, an updated knowledge level is calculated for the student as a function of the response data, the present knowledge level associated with the student, and the difficulty level of the next practice datagraph microstructure. Some embodiments iterate the identifying at stage 920, the presenting at stage 924, the receiving at stage 928, and the calculating at stage 932, until the updated knowledge level for the student reaches a target knowledge level (e.g., a mastery threshold, or the like) stored in association with the knowledge entity.

Returning to FIG. 6, in some embodiments, a student profiler 670 maintains student profile information 675 about one or more students. For example, the student profiler 670 can be a non-transient data store, a processor-implemented block, and/or any other suitable functional element. The student profiler 670 can be disposed centrally (e.g., in a remote computational environment, for example, along with the course data store), disposed locally (e.g., in a student's local computational environment), etc. In some implementations, the student profile information 675 can impact operations of the acquisition monitor 620. For example, the student profile information 675 can include information about which knowledge entities 210 have previously been consumed and/or acquired by the student, or student traits known or thought to have an impact on performance for a particular knowledge entity 210 (e.g., learning style, gender, prior knowledge, etc.). The acquisition monitor 620 can, in some instances, determine the initial knowledge level for a student based on such student profile information 675. For example, the initial knowledge level can be provided as an input knowledge level 625 to the knowledge level estimator 630 in the first iteration.

As described above, certain adaptive functionality is intended to operate in context of a knowledge entity 210 that has multiple embedded practice datagraph microstructures 350, and each practice datagraph microstructures 350 can have an associated difficulty level 605. Some implementations automatically initialize each practice datagraph microstructure 350 with a respective difficulty level 605 (e.g., a default value, such as 0.5 on a scale from 0.0 to 1.0). Other implementations permit course authors (or other authorized individuals) to assign a desired difficulty level 605 to each practice datagraph microstructure 350. Other implementations allow students and/or others to nominate, vote, suggest, or otherwise directly influence a determination of difficulty level 605 for practice datagraph microstructures 350. Other implementations, as described below, can compute appropriate difficulty levels 605 for the practice datagraph microstructures 350 based, for example, on statistical information relating to prior responses to those practice datagraph microstructures 350 by many students.

In some embodiments, while there is inadequate (e.g., insufficient, unreliable, untested, unverified, etc.) difficulty level 605 information for the practice datagraph microstructures 350 of a knowledge entity 210, certain measures are taken in an attempt to capture such information. For example, some implementations desire to acquire sufficient statistical information to assign a reliable difficulty level 605 to each practice datagraph microstructure 350. Prior to acquiring sufficient statistical information, embodiments can present students with a fixed set of practice datagraph microstructures 350 to determine whether the student has acquired the knowledge entity 210. For example, the student can be provided with a predetermined number of practice datagraph microstructures 350 selected at random, a number of practice datagraph microstructures 350 defined by the course author as a default set, a set of practice datagraph microstructures 350 that includes a desired range of difficulty levels 605 (even if those difficulty levels 605 are not reliable at that stage), or any other suitable set of practice datagraph microstructures 350. In such a context, the knowledge level of the student may be determined and/or updated only after all (or some subset) of the practice datagraph microstructures 350 have been consumed and response data 650 has been acquired (as opposed to updating the knowledge level after each practice datagraph microstructure 350 is consumed). For example, the student's knowledge level can be computed according to a percentage of correct responses provided to the practice datagraph microstructures 350 (e.g., and/or additional response data 650, such as response speed, response confidence, categorical aptitude, etc.).

Once a large enough sample of student responses have been received for the practice datagraph microstructures 350, statistical data can be generated from that data for use in computing appropriate difficulty levels 605. Some embodiments include a processor-implemented difficulty level estimator 610 that assigns the respective difficulty levels 605 to the practice datagraph microstructures 350. For example, a prior response dataset 615 can be generated from large numbers of prior student responses, and the prior response dataset 615 can be used by the difficulty level estimator 610 to compute the difficulty levels 605.

Figure 10:
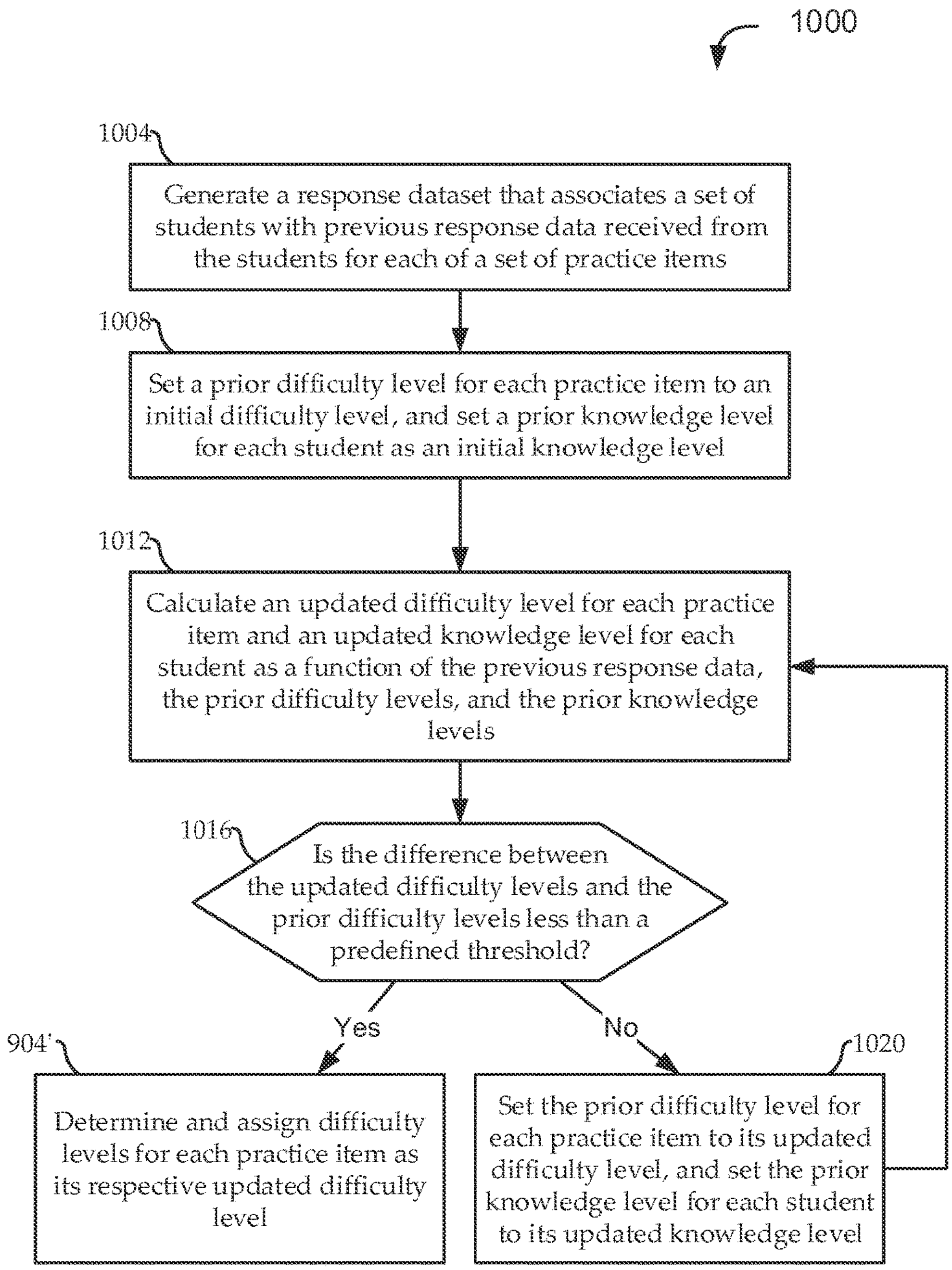
FIG. 10 shows a flow diagram of an illustrative method for assigning difficulty levels to the practice datagraph microstructures of a knowledge entity, according to various embodiments.

FIG. 10 shows a flow diagram of an illustrative method 1000 for assigning difficulty levels 605 to the practice datagraph microstructures 350 of a knowledge entity 210, according to various embodiments. Embodiments of the method 1000 begin at stage 1004 by generating a response dataset (e.g., prior response dataset 615 of FIG. 6) that associates a plurality of students with previous response data received for each of the practice datagraph microstructures 350 from the plurality of students. For example, a table can be generated to include each student's response to each practice datagraph microstructure 350 (e.g., where available, in cases where not all students have consumed all practice datagraph microstructures 350). At stage 1008, a prior difficulty level can be set for each practice datagraph microstructure 350 to an initial difficulty level 605, and a prior knowledge level can be set for each of the plurality of students to an initial knowledge level. For example, the initial difficulty levels 605 for all practice datagraph microstructures 350 can be set to 0.5 (or any other suitable value, as described above), and the initial knowledge level for each student can be set to 0.5 (or 0.0, or any other suitable value, as described above). Embodiments of the method typically use a fabricated knowledge level for each student, not an actual knowledge level of the student.

Embodiments of the method 1000 continue by iterating through stages 1012, 1016, and 1020, until appropriate difficulty levels 605 are determined. In each iteration, at stage 1012, an updated difficulty level 605 is calculated for each practice datagraph microstructure 350 and an updated knowledge level 635 is calculated for each of the plurality of students as a function of the previous response data, the prior difficulty levels, and the prior knowledge levels. For example, the calculating can involve determining how difficult each practice datagraph microstructure 350 appears to be based on statistical performance across all the students who consumed the practice datagraph microstructure 350, and the respective knowledge levels of those students (e.g., which may be the same for all students in at least the first iteration). After the updated difficulty levels are computed, each student's knowledge level can be recomputed for that iteration by simulating the student consuming each practice datagraph microstructure 350, and adjusting the student's knowledge level after each practice datagraph microstructure 350 is consumed according to the newly updated difficulty levels of the practice datagraph microstructures 350 (e.g., in the manner described above with reference to FIG. 9).

At stage 1016, a determination can be made as to whether the updated difficulty level (after the calculating in stage 1012) differs from the prior difficulty level (from before the calculating in stage 1012) by less than a pre-determined threshold amount. Some implementations can stop iterating at other suitable times, for example, after a predetermined number of iterations, etc. If the updated difficulty level does not differ from the prior difficulty level by less than the pre-determined threshold amount (i.e., the solution has not sufficiently converged), embodiments can prepare for a next iteration. For example, at stage 1020, the prior difficulty level for each practice datagraph microstructure 350 can be set to the updated difficulty level, and the prior knowledge level for each of the plurality of students can be set to the updated knowledge level. The method 1000 can then return to stage 1012 for another iteration. Notably, in this next iteration of stage 1012, the same calculation can be performed based on the same set of prior responses, but the calculation is based on new values for difficulty levels and knowledge levels. If, at stage 1016, the updated difficulty level is found to differ from the prior difficulty level by less than the pre-determined threshold amount, the solution can be considered to have sufficiently converged, and no more iterations may be needed. Accordingly, at stage 904', embodiments can assign the respective difficulty levels to the practice datagraph microstructures 350 as their respective updated difficulty levels.

Returning to FIG. 6, some embodiments provide additional types of adaptations. Many of the novel types of adaptations described above are "entity-level" adaptations. For example, one category of entity-level adaptations described above can dynamically select practice datagraph microstructures 350 to present to a student (e.g., as a function of the difficulty levels 605 of the practice datagraph microstructures 350 and the knowledge level of the student) in an attempt to optimize the knowledge acquisition of the student. Another category of entity-level adaptations described above can adapt initial knowledge levels of students for a knowledge entity 210 based on computed knowledge levels of the students for previously-acquired (or consumed) knowledge entities 210; and/or adapt previously computed knowledge levels of the students for previously-acquired (or consumed) knowledge entities 210 based on presently computed knowledge levels of students for a presently acquired (or consumed) knowledge entity 210. For example, such adaptations can be particularly applicable in context of practice datagraph microstructures 350 (and/or lesson datagraph microstructures 305) that are shared between multiple knowledge entities 210).

Another category of adaptation is a course-level adaptation. Some embodiments include a processor-implemented course adaptor 660 to perform such adaptations. As described above, knowledge entities 210 can be linked in a course datagraph macrostructure 105 by different types of knowledge edges. One type of such knowledge edge is a variant edge that identifies two or more knowledge entities 210 as variants of each other. Variants can be used, for example, to present a same or similar concept at varying levels of detail (e.g., a statistics course may be presented at one level for mathematics majors and at a different level for business majors), to present a same or similar concept with different types of examples (e.g., depending on different learning styles, different demographics (gender, socioeconomics, politics, nationality, etc.), different contexts (e.g., relating to a particular course of study or identified interest, etc.), etc.), to present a same or similar concept by different instructors (e.g., where different course authors contribute knowledge entities relating to a similar subject), etc. In practice, as a student traverses a course datagraph macrostructure 105 (e.g., as a student consumes a course) and encounters a variant, embodiments can automatically select one of the variants to present to the student in a manner that seeks to improve the student's acquisition of the concept presented by the variants. For example, the variant can be selected based on profile information of the student and/or based on the course flow being consumed by the student (e.g., where the variants are part of multiple courses, where different students have different prior knowledge, etc.). In some contexts involving such variants, an overall course or group of knowledge entities 210 can behave in an appreciably consistent manner, regardless of which variant is selected. For example, the course flow can be substantially the same for all students in the course, even though different variants may be selected along the way.

Figure 11:
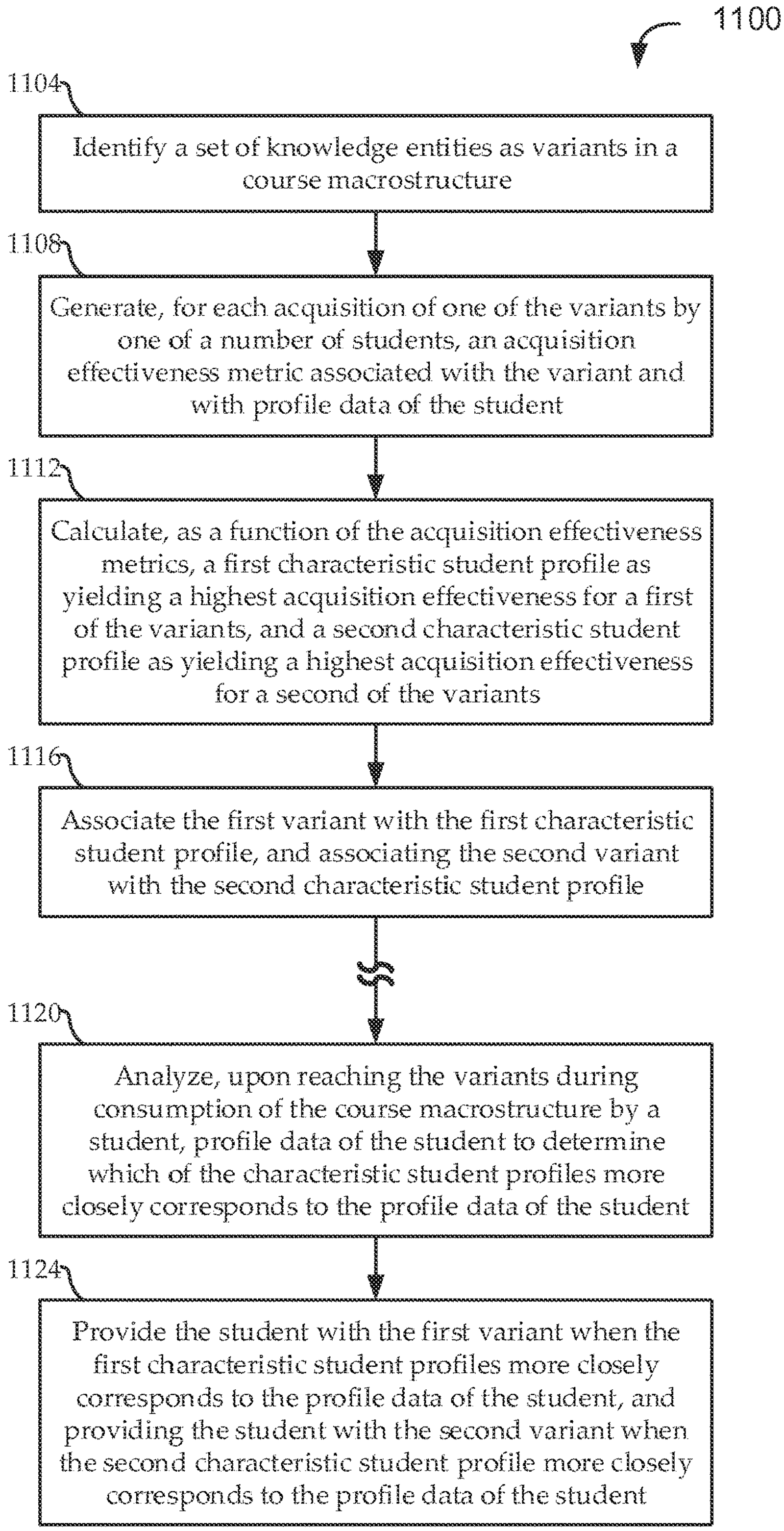
FIG. 11 shows a flow diagram of an illustrative method 1100 for adapting a course with multiple variant knowledge entities, according to various embodiments.

While it can be desirable in some instances to adapt a course to a particular student by selecting an appropriate variant knowledge entity to present to that student, there may not be clear, a priori selection criteria. For example, in some instances, the course authors can indicate (e.g., in metadata of the knowledge entities or the edges) which criteria to use to select one variant over another (e.g., the course flow being consumed, the student's prior knowledge, student demographics, student learning style, etc.). In other instances, such information is not provided or may be unreliable (e.g., the course author has identified certain criteria, but it is desirable to verify the efficacy of that identification).

Where such a priori information is not available or not reliable, embodiments can seek to identify the most effective selection criteria from a sample set of previous responses. For example, FIG. 11 shows a flow diagram of an illustrative method 1100 for adapting a course with multiple variant knowledge entities, according to various embodiments. Embodiments begin at stage 1104 by identifying a set of knowledge entities as variants. The identification can be based, for example, on linking of the knowledge entities by a variant knowledge edge. Some implementations can seek to infer potential variants and either automatically link them by a knowledge edge or suggest such a link to a course author.

At stage 1108, acquisition effectiveness metrics can be generated for each variant knowledge entity. For example, after a large number of students has acquired multiple variant knowledge entities, a dataset can be generated to associate acquisition effectiveness parameters for each variant (e.g., correctness of responses, speed of responses, confidence level in responses, etc.) with student profile information (e.g., initial assigned knowledge level, prior knowledge, course of study, demographics, etc.) for the students that have acquired those variants.

At stage 1112, embodiments can calculate, as a function of the acquisition effectiveness metrics, a first characteristic student profile as yielding a highest acquisition effectiveness for a first of the variants, and a second characteristic student profile as yielding a highest acquisition effectiveness for a second of the variants. For example, machine learning can be used to interpret the dataset to derive which student profile information tends to yield the highest acquisition effectiveness for each variant knowledge entity. In some implementation, Bayesian analyses and/or other statistical methods can find highest correlations between student profile information and acquisition effectiveness to output the most effective selection criteria. In some embodiments, determination of the selection criteria can include de-conflicting of the criteria to ensure that a single variant selection can be output from any input set of profile information. At stage 1116, the computed selection criteria can be assigned to the variants in any suitable manner (e.g., as metadata of the variants or of the knowledge edges). For example, the first characteristic student profile can be assigned as selection criteria for the first of the variants, and the second characteristic student profile can be assigned as selection criteria for the second of the variants.

At some subsequent time, additional students can encounter the variant knowledge entities. At stage 1120, embodiments can analyze, upon reaching the variants during consumption of the course macrostructure by each student, profile data of the student to determine which of the characteristic student profiles more closely corresponds to the profile data of the student. For example, embodiments can correlate the student's profile information against the determined selection criteria to identify which variant knowledge entity will yield the highest acquisition effectiveness for that student. At stage 1124, embodiments can provide the student with the first variant when the first characteristic student profiles more closely corresponds to the profile data of the student, and can provide the student with the second variant when the second characteristic student profile more closely corresponds to the profile data of the student.

Figure 7:
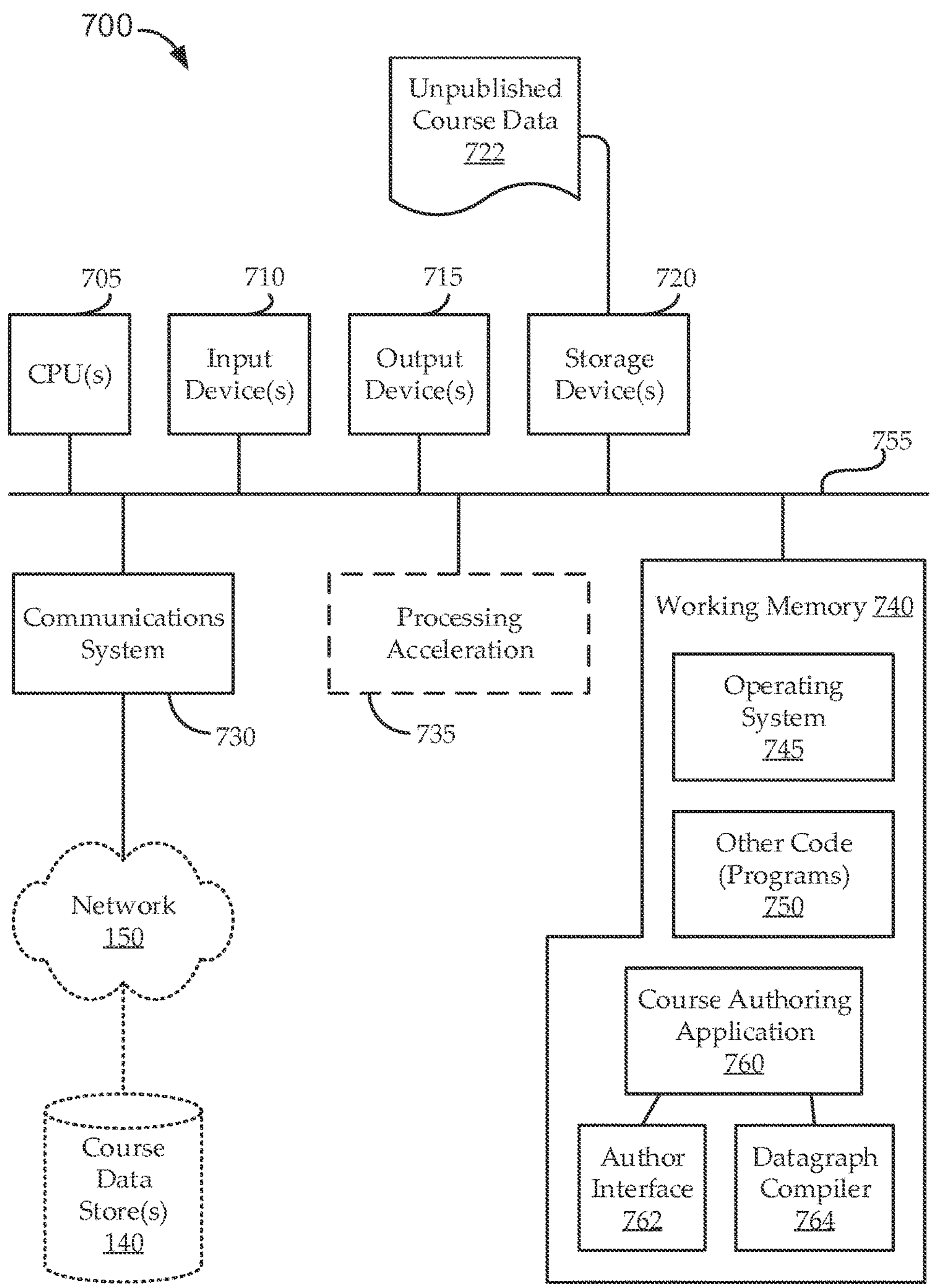
FIG. 7 shows an illustrative computational system for implementing one or more systems or components of systems, according to various embodiments.

FIG. 7 shows an illustrative computational system 700 for implementing one or more systems or components of systems, according to various embodiments. The computational system 700 is described as a particular machine for implementing course authoring functionality, like the course authoring platform 160 described with reference to FIG. 1. Embodiments of the computational system 700 can be implemented as or embodied in single or distributed computer systems, or in any other useful way.

The computational system 700 is shown including hardware elements that can be electrically coupled via a bus 755. The hardware elements can include one or more processors (shown as central processing units, "CPU(s)") 705, one or more input devices 710 (e.g., a mouse, a keyboard, etc.), and one or more output devices 715 (e.g., a display, a printer, etc.). The computational system 700 can also include one or more storage devices 720. By way of example, storage device(s) 720 can be disk drives, optical storage devices, solid-state storage device such as a random access memory (RAM) and/or a read-only memory (ROM), which can be programmable, flash-updateable and/or the like. In some embodiments, the storage devices 720 are configured to store unpublished course data 722. For example, while course data (e.g., knowledge entities, microstructures, step objects, etc.) are being edited, unpublished or otherwise unofficial versions can be stored by certain implementations of a course authoring platform).

The computational system 700 can additionally include a communications system 730 (e.g., a modem, a network card (wireless or wired) or chipset, an infra-red communication device, etc.). The communications system 730 can permit data to be exchanged with a public or private network and/or any other system. For example, as shown in FIG. 1, the communications system 730 can permit the course authoring platform to communicate with a remote (e.g., cloud-based) course data store 140 via a public or private network 150 (shown in dashed lines for context). In some embodiments, the computational system 700 can also include a processing acceleration unit 735, which can include a DSP, a special-purpose processor and/or the like.

Embodiments can also include working memory 740, which can include RAM and ROM devices, and/or any other suitable memory. The computational system 700 can also include software elements, shown as being currently located within a working memory 740, including an operating system 745 and/or other code 750, such as an application program (which can be a client application, web browser, mid-tier application, relational database management system (RDBMS), etc.). As illustrated, a course authoring application 760 can be implemented in the working memory 740. Some implementations of the course authoring application 760 and can include an author interface 762. For example, the author interface 762 can provide graphical user interface (GUI) and/or other functionality for receiving authoring commands relating to creation, editing, publishing, and/or other authoring-related course functions. Some implementations of the course authoring application 760 and can include a datagraph compiler 764. For example, the datagraph compiler 764 can translate received authoring commands into datagraph commands for execution by the processor(s) 705 in interfacing with the datagraph structure for course authoring.

In some embodiments, the course data store 140 and/or the storage device(s) 720 implement a non-transient course data store that stores a course datagraph macrostructure having lesson datagraph microstructures embedded therein. The processor(s) 705 of the computational system 700 implement functions of a course authoring platform as the course authoring application 760, including receiving authoring commands (via the author interface 762), translating the authoring commands to executable datagraph commands (via the datagraph compiler 764), and executing the datagraph commands with the processor(s) 705. Executing the datagraph commands can include instantiating a number of knowledge entities as nodes of the course datagraph macrostructure, linking each knowledge entity with at least one other knowledge entity by instantiating a respective knowledge edge having a respective set of knowledge edge attributes that defines a course flow relationship between the knowledge entities; and embedding each knowledge entity with at least one of the lesson datagraph microstructures in the course data store by instantiating a number of lesson step objects as nodes of the lesson datagraph microstructure, defining a set of lesson responses associated with each lesson step object, and linking each lesson step object with at least one other lesson step object in the lesson datagraph microstructure by instantiating a respective lesson edge that defines a lesson flow relationship between the lesson step objects.

Figure 8:
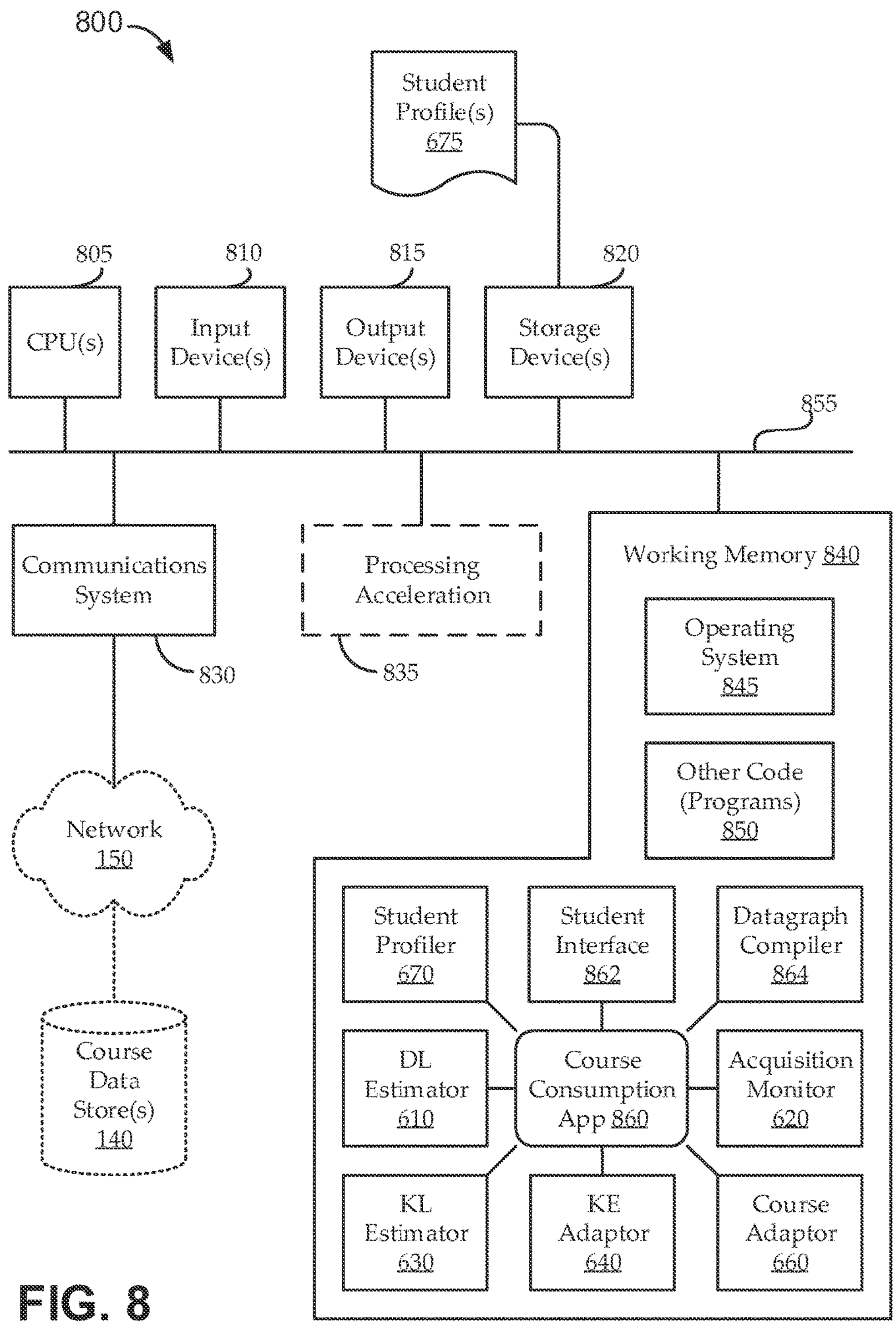
FIG. 8 shows another illustrative computational system for implementing one or more systems or components of systems, according to various embodiments.

FIG. 8 shows another illustrative computational system 800 for implementing one or more systems or components of systems, according to various embodiments. The computational system 800 is described as a particular machine for implementing course consumption functionality, like the course consumption platform 170 described with reference to FIG. 1. Embodiments of the computational system 800 can be implemented as or embodied in single or distributed computer systems, or in any other useful way.

The computational system 800 is shown including hardware elements that can be electrically coupled via a bus 855. The hardware elements can include one or more processors (shown as central processing units, "CPU(s)") 805, one or more input devices 810 (e.g., a mouse, a keyboard, etc.), and one or more output devices 815 (e.g., a display, a printer, etc.). The computational system 800 can also include one or more storage devices 820. By way of example, storage device(s) 820 can be disk drives, optical storage devices, solid-state storage device such as a random access memory (RAM) and/or a read-only memory (ROM), which can be programmable, flash-updateable and/or the like. In some embodiments, the storage devices 820 are configured to store student-specific data (e.g., student profile(s) 675). For example, some implementations of the course consumption platform can store profile information about one or more student.

The computational system 800 can additionally include a communications system 830 (e.g., a modem, a network card (wireless or wired) or chipset, an infra-red communication device, etc.). The communications system 830 can permit data to be exchanged with a public or private network and/or any other system. For example, as shown in FIG. 1, the communications system 830 can permit the course consumption platform to communicate with a remote (e.g., cloud-based) course data store 140 via a public or private network 150 (shown in dashed lines for context). In some embodiments, the computational system 800 can also include a processing acceleration unit 835, which can include a DSP, a special-purpose processor and/or the like.

Embodiments can also include working memory 840, which can include RAM and ROM devices, and/or any other suitable memory. The computational system 800 can also include software elements, shown as being currently located within a working memory 840, including an operating system 845 and/or other code 850, such as an application program (which can be a client application, web browser, mid-tier application, relational database management system (RDBMS), etc.). As illustrated, a course consumption application 860 can be implemented in the working memory 840. Some implementations of the course consumption application 860 and can include a student interface 862. For example, the student interface 862 can provide graphical user interface (GUI) and/or other functionality for receiving interaction commands relating to consuming knowledge entities, microstructures, step objects, etc. (e.g., student interactions with responses, timer data, etc.), and/or other consumption-related course functions. Some implementations of the course consumption application 860 and can include a datagraph compiler 864. For example, the datagraph compiler 864 can translate received interaction commands into datagraph commands for execution by the processor(s) 805 in interfacing with the datagraph structure for dynamic course generation, course adaptation, course display, etc. Some implementations of the course consumption application 860 and can include a student profiler 670. For example, the student profiler 670 can receive explicit profile information from a student (e.g., through a profile page, an external database, etc.), monitor student interactions with course materials to infer student profile information (e.g., learning styles, strengths, tendencies, etc.), and/or develop the student profile in any other suitable manner. In some embodiments, the course consumption application 860 implements functions of one or more other blocks described herein.

In some embodiments, the course data store 140 and/or the storage device(s) 820 implement a non-transient course data store that stores an e-learning datagraph structure. The datagraph structure can include a number of knowledge entities stored as nodes of a course datagraph macrostructure, each knowledge entity being linked with at least one other knowledge entity in the course datagraph macrostructure via a respective knowledge edge having a respective set of knowledge edge attributes that defines a course flow relationship among the knowledge entities. Each knowledge entity can include one or more lesson datagraph microstructure having one or more lesson step objects, each linked with at least another of the lesson step objects by a respective lesson edge that defines a lesson flow relationship between the lesson step objects; and one or more practice datagraph microstructures, each assigned a respective difficulty level, and each having one or more practice step objects, each practice step object linked with at least another of the practice step objects by a respective practice edge that defines a practice flow relationship between the practice step objects.

The processor(s) 805 of the computational system 800 implement functions of a course consumption platform as the course consumption application 860, including determining a profile of a first student (via the student profiler 670), and adaptively generating and displaying an e-learning course from the c-learning datagraph structure according to the profile of the first student (via the student interface 862 and the datagraph compiler 864). As described above, the e-learning datagraph structure permits dynamic adaptation of the course materials to each student. For example, a first instance of the computational system 800 can use its processor(s) 805 to implement a first instance of a course consumption platform that determines a profile of a first student and adaptively generates and displays a first instance of an e-learning course from the e-learning datagraph structure according to the profile of the first student; and a second instance of the computational system 800 can use its processor(s) 805 to implement a second instance of a course consumption platform that determines a profile of a second student and adaptively generates and displays a second instance of an e-learning course from the same e-learning datagraph structure according to the profile of the second student (i.e., where the second instance is different from the first instance).

It should be appreciated that alternate embodiments of computational systems 700 and 800 can have numerous variations from those described above. For example, customized hardware can be used and/or particular elements can be implemented in hardware, software (including portable software, such as applets), or both. Further, connection to other computing devices such as network input/output devices can be employed. In various embodiments a computational systems, like those illustrated in FIGS. 7 and 8, can be used to implement one or more functions of the systems described with reference to FIGS. 1 and 6 and/or to implement one or more methods, such as those described with reference to FIGS. 9 and 10.

Tutoring Flow

Embodiments described herein can be implemented in many different ways. One type of implementation is to create a virtual private tutor with which a student can effectively "dialogue" during consumption of a course. Using adaptations described herein, the virtual tutor can continuously attempt to understand the student, while simultaneously attempting to keep the student engaged and improving his knowledge in an optimal way. For example, the virtual private tutor can determine which parts of all of the content are "legal"/"eligible" for being presented to the student at a given point in time, by checking whether all prerequisites of an item have either been met or are considered to be prior knowledge which has not yet been encountered (e.g., by multiple negative impacts being sent to the prior knowledge entity). Some implementations can choose from (or rank) all eligible content using a large set of considerations, including, for example, pedagogical considerations, current estimated mastery level for each of the content items in the course, calculated as a function of the complete historical performance of the student in relation to each item (e.g., time of each exposure (direct or indirect, for example, via impact), exposure results (for example, success/failure/neutral/partial success after some failures, etc.), confidence level of the student in each response, the subjective understanding levels indicated by the student, etc.), "cool-offs" (e.g., putting a topic that has just been learnt/practice on a temporary hold so that the next exposure to that topic can be after some calendar time has passed, allowing for the previous learning of that topic to "sink in"), task inventory (e.g., all else being equal, a topic with more available unseen tasks will be preferred, as it, for example, allows to distribute the content more evenly across the calendar time up until the course completion data/final exam), learning path strategy, time constraints, upcoming midterm or finals goals, learning versus practice ratio, ratio of topics, forgetting curves, controlled experiments for testing effectiveness (e.g., for improving the overall system even at the expense of the individual student, student parameters, like performance, age, gender, etc; reputation of the content authors/moderators responsible for it; related tasks; biofeedback, such as anxiety or boredom; course customizations by a local chief; etc.), etc. With a choosing operation mode, embodiments can use an advanced neural network, machine learning, kernel method, decision tree, or other suitable technique to choose the next most desirable content item. In the ranking operation mode, the ranking function itself can be subject to iterations and evolution. For example, system developers can periodically add new function variations, and the system can automatically compete each function against others by using each function for a random subset of users and comparing the performance of each subset after a predefined period of time and/or learning progress. The function yielding a higher average performance metric for its users can be declared as the winner, and can subsequently be used for all users until a new ranking function is added.

Some embodiments permit a student to learn in multiple modes. For example, implementations can include an "autopilot" mode (e.g., the top ranked piece of content is autoprovided), "semi-automatic" mode (e.g., up to a fixed number of top-ranked items are given as options for the student), "manual" mode (e.g., all items can be chosen, with certain non-eligible items potentially requiring a fulfillment of eligibility requirements), "Target-mode" (e.g., a non-eligible item can be chosen, the entire dependency tree is calculated to identify all of the entities that need to be acquired and/or mastered to the respective level, and then these entities are given in order of subsequent eligibility so that the student can reach the target entity in the shortest amount of time with all of the prerequisites being met), etc. As described herein, various adaptations are possible. According to one such adaptation, macro-variations can be provided for chosen pieces of content (e.g., based on performance history, correlations, mental attributes/tags, moderation status, etc.). For example, whenever there is more than one variation available for a micro-lesson, the system will choose among the variations (e.g., using a ranking or choosing function); and before there is sufficient data on any variation set to have statistical significance of any variation being superior for any given user profile, the variations can be rotated (e.g., round-robin style). According to another such adaptation, micro-variations can be provided. For example, variations of prompts can be either rotated (as round-robin, in a weighted mode based on the level of confidence the system already has for each variation, etc.), or chosen using the same methods as for the macro-variations.

Some embodiments decide when and how to present time awareness training (TAT). For example, the system starts out by having a global default rule for when to display the time awareness training. The rule can contain such criteria as a minimum number of items shown since the last appearance of the TAT, types of content for which it is allowed to display the TAT, etc. In some implementations, the user may be allowed, when the TAT appears, to skip it (a "skip event"). In this case, the system may automatically decrease the frequency in which the TAT appears and/or further limit the types of content for which the TAT may appear (e.g., only showing the TAT for more difficult practice items). Whenever the user does respond to the TAT, the frequency may increase, according to a formula (e.g., out of various options fed into the system by the developers, and updated from time to time) that the system discovers to yield the least percentage of TAT "skip events." The user's inclination to see the TAT can be detected with ever increasing precision. In addition, a function that weights all of the users' TAT preferences (e.g., frequency and content types), with the weights being the statistical confidence level for each student's TAT preference, can be used to determine the global default TAT preferences that will be used for new students for which there is not yet sufficient data on this preference.

Some embodiments exploit biofeedback for adaptations. For example, embodiments can receive and save input from various sensors, including skin-conductivity, skin-acidity, skin-moisture, temperature, pulse rate, EEG, muscle tension, and/or other sensors. Embodiments can continuously search for correlations between the sensors' data and the conventional interpretations of such data (e.g., that an increase in moisture, lowering in temperature, and increase in pulse rate, indicates mental tension) and the student's performance in order to detect the student's personal learning-related tendencies and feeds that back to the ranking/choosing methods (e.g., detecting that challenging one student at significantly above his current level, or presenting to that student questions from a specific topic creates an increase in tension and thereby decreases performance). In such a case, the implementations can subsequently choose to challenge that student less and to show that anxiety-inducing topic at significantly lower difficulty levels than would otherwise be presented. This can allow for rapidly modifying the system choosing/ranking by getting an immediate biofeedback that correlates to a future performance increase/decrease, instead of waiting for that future performance change to be actually measured and only then starting to respond to it. Similarly, embodiments can infer levels of alertness (e.g., or drowsiness, boredom, etc.) using standard methods, and then attempt to bring them into the desired ranges for effective learning (e.g., by choosing/ranking-higher content items that are known to be stimulating for previous students, when a student is now starting to become bored or drowsy).

Some embodiments adapt to performance trends. For example, student encouragement can be automatically impacted by detecting that the student is experiencing a positive or negative streak, or the like. Similarly, reminders and/or motivators for coming back to study can be adapted to detected correlations between certain times of day, frequencies, etc. For example, when a clear correlation is determined between certain times of the day (or week, month, etc.), frequency and/or content of reminder alerts, spacing of new knowledge versus review, and/or other parameters can be adapted accordingly (e.g., to individual students and/or globally).

Some implementations include a confidence level controller. For example, embodiments can permit (or require) a student to indicate (e.g., by the hover position of the mouse) the student's confidence level in each of the student's responses (except in some degenerate cases, e.g., when only a single response option is available at some point in time). This indication can be obtained before the student gets the feedback on whether or not the respective response is correct or incorrect. Other embodiments can provide an understanding level controller. For example, the system permit or require a student to indicate (e.g., by dragging the mouse across a rating scale) the student's subjective level of understanding a topic, at various points from the time immediately at the completion of the initial micro-lesson, and throughout the subsequent learning. Some embodiments further provide adaptive challenges, for example, by competing against peers or against the clock (e.g., with indicators of record time for that task, 2nd place, etc.). For example, an implementation can optionally adapt the type and level of challenges presented to each student at each point in time. Performance is measured and correlated to the challenges given in order to adjust the challenges for yielding optimal student performance (e.g., a student may exhibit a monotonously increasing performance as the challenges difficulty levels increase to 120% of the estimated student's mastery level for a given topic at a given time, and decreasing performance when going beyond 120%, as when the student becomes overwhelmed or anxious, etc.). Different students are found to have different challenge levels for maximum performance, and the average values across the entire student base (or per-course, or per-demography, etc. as the case may be) are used as the default value from which the system starts searching for the personal optimum of each new student.

Some embodiments can adapt to an available time window (e.g., for scheduled sessions). For example, the system, when used in the learning-session mode (i.e., when the student requests/expects the learning session to last a certain number of minutes/end at a certain time), ensures that there is a very high probability of the learning session ending very close, and usually slightly before, the desired/expected end-time. This is achieved by considering historical timing data for all of the content items which are being evaluated for being presented in the session and factoring them into the ranking/choosing. For example, in the early parts of the session, there would be a relative advantage to items which took previous students a higher average time and had higher standard deviations. In some cases, each specific student's timing can be compared to the general student population's timing (e.g., the average and standard deviation times of completing each item), to calculate a personal coefficient for the specific student that can be used to calibrate the expected value and confidence level (e.g., based on the standard deviation) predictions per item for that student. Individual timing predictions (per item per student, after calibration) can be used (e.g., near the very end of the session, when there can be a very strong advantage to items whose expected timing is very close to the remaining time of the session, and with maximum confidence or minimum standard deviation).

Some implementations can include a countdown timer (CDT). For example, embodiments can optionally show a timer that counts down for the student for any step (e.g., when a practice item is presented). The system can adapt the type of content items for which the CDT is shown, the frequency in which the CDT is shown, and the initial time which the CDT starts counting from for each student, by analyzing the correlation between the appearance of the CDT and students' performance (both in general, for calculating the optimal default values, and per student). When the CDT reaches zero (the student runs out of time) the student is shown (if available) a default step that corresponds to an (invisible to the student) "I ran out of time" response, which may include its own impacts.

Some other embodiments can adapt example domains and present-events for content. For example, pieces of content (e.g., entire entities and even substrings, images, etc. inside step prompts) can be "tagged" as belonging to certain knowledge domains/fields of interest etc. (e.g., "sports", "politics", etc.). Whenever the system has variations that contain content tagged with such domains, the system looks for correlations between each such variation and engagement, timing, and performance, and adapts the choice of future variations according to the correlations detected. For example, if a student is very interested in sports but disinterested in politics, the learning data would quickly indicate the items with sports-related content variations better engage the student and/or have better timing, and/or have better success rates and/or improved confidence levels (higher for correct responses and lower for incorrect responses) when compared to politics-related variations—and this can lead implementations to subsequently prefer (all else being equal) sports-related variations over the politics-related ones. Another type of adaptation involves frequency and style of self-assessment requests. For example, the system optionally asks the student from time to time for self-assessments (e.g., "highlight the sentence you didn't understand"; "say to the mic what you didn't understand"; "which of the following menu options best describes what you did not understand?"; etc.). Embodiments can adapt to the type of self-assessment presented according to the types with the highest percentage of response (as opposed to skipping the self-assessment request that is presented), and can adapt the frequency according to both global optimization and personal adjustments.

Some embodiments permit a student, for designated items or types of items, to review ("peck") at alternate explanations within the same practice item, that correspond to the "path not taken" (i.e. to responses not chosen in previous steps). The system can also optionally adapt to the types of content and frequency in which such an option is provided to the student, based on analysis of the student's learning performance, and of all students' learning performance, as a function of previous "peeks." For example, if for a specific student a clear correlation is discovered between the option to peek and increased performance, then the system will give this student more of this option going forward, and vice versa.

The methods disclosed herein include one or more actions for achieving the described method. The method and/or actions may be interchanged with one another without departing from the scope of the claims. In other words, unless a specific order of actions is specified, the order and/or use of specific actions may be modified without departing from the scope of the claims.

The functions described may be implemented in hardware, software, firmware, or any combination thereof. If implemented in software, the functions may be stored as one or more instructions on a tangible computer-readable medium. A storage medium may be any available tangible medium that can be accessed by a computer. By way of example, and not limitation, such computer-readable media can include RAM, ROM. EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

A computer program product may perform certain operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by suitable terminals and/or coupled to servers, or the like, to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. As used herein, a "set" of elements is intended to mean "one or more" of those elements, except where the set is explicitly required to have more than one or explicitly permitted to be a null set.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A system for optimizing knowledge acquisition by students in an e-learning datagraph structure, the system comprising:

a non-transient course data store that stores a course datagraph macrostructure having a knowledge entity as a node of the course datagraph macrostructure, the knowledge entity having embedded therein:

a lesson datagraph microstructure comprising a plurality of lesson step objects, each linked with at least another of the lesson step objects by a respective lesson edge that defines a lesson flow relationship between the lesson step objects; and a plurality of practice datagraph microstructures, each assigned a respective difficulty level, and each comprising a plurality of practice step objects, each practice step object linked with at least another of the practice step objects by a respective practice edge that defines a practice flow relationship between the practice step objects; and a set of processors in communication with the course data store that implements a course consumption platform to receive consumption commands from a student, translate the consumption commands to executable datagraph commands, and execute the datagraph commands with the set of processors to:

identify a next practice datagraph microstructure to present to the student so as to adapt the knowledge entity of the course to the student as a function of a present knowledge level associated with the student and as a function of the respective difficulty levels of the plurality of practice datagraph microstructures;

receive response data from the student in response to displaying the next practice datagraph microstructure to the student;

calculate an updated knowledge level for the student as a function of the response data, the present knowledge level associated with the student, and the difficulty level of the next practice datagraph microstructure, wherein the set of processors dynamically reduce an effect by the response data on the updated knowledge level in conjunction with an increase in a difference between the present knowledge level and the respective difficulty level of the next practice datagraph microstructure from which the response data was obtained, wherein the set of processors dynamically increase an effect by the response data on the updated knowledge level in conjunction with a decrease in the difference between the present knowledge level and the respective difficulty level of the next practice datagraph microstructure from which the response data was obtained; and set the updated knowledge level as the present knowledge level for the student after the set of processors perform the calculating, wherein iteration of the identifying, receiving, calculating and setting by the set of processors increases acquisition of knowledge associated with the knowledge entity.

2. The system of claim 1, wherein the set of processors executes the datagraph commands with the processor further to:

iterate the identifying, receiving, calculating and setting until either the updated knowledge level for the student reaches a target knowledge level stored in association with the knowledge entity or all the plurality of practice datagraph microstructures of the knowledge entity are consumed.

3. The system of claim 2, wherein:

the next practice datagraph microstructure is consumed when the response data is received from the student in response to displaying the next practice datagraph microstructure.

4. The system of claim 1, wherein the set of processors assign the respective difficulty levels to the practice datagraph microstructures by:

generating a response dataset that associates a plurality of students with previous response data received for each of the practice datagraph microstructures from the plurality of students;

setting a prior difficulty level for each practice datagraph microstructure and setting a prior knowledge level for each of the plurality of students;

calculating an updated difficulty level for each practice datagraph microstructure and an updated knowledge level for each of the plurality of students as a function of the previous response data, the prior difficulty levels for the practice datagraph microstructures, and the prior knowledge levels for the plurality of students; and determining whether the updated difficulty level for each practice datagraph microstructure differs from the prior difficulty level for each practice datagraph microstructure by less than a pre-determined threshold amount, wherein:

when an answer to the determining is positive, the set of processors assign the updated difficulty levels to the practice datagraph microstructures as their respective difficulty levels; or when an answer to the determining is negative, the set of processors set the updated difficulty level for each practice datagraph microstructure as the prior difficulty level, set the updated knowledge level for each of the plurality of students as the prior knowledge level, and return to the calculating step.

5. The system of claim 1, wherein:

the knowledge entity is a first of a plurality of knowledge entities in the course datagraph macrostructure; and each knowledge entity is linked with at least another of the knowledge entities by a respective knowledge edge that defines a course flow relationship between the knowledge entities.

6. The system of claim 5, wherein:

an initial knowledge level of the student for the first knowledge entity is determined as least partially according to the student's prior consumption of at least another of the plurality of knowledge entities in the course datagraph macrostructure that is logically related to the present knowledge entity.

7. The system of claim 1, wherein the course data store is disposed in a first computational environment remote from the student.

8. The system of claim 7, wherein at least one of the set of processors is disposed in a second computational environment local to the student, and the first and second computational environments are in communication over a communications network.

9. The system of claim 1, wherein:

the course consumption platform comprises a graphical user interface that receives the consumption commands from the student and translates the consumption commands to datagraph commands for execution by the set of processors; and the set of processors receives the response data from the student in response to displaying the next practice datagraph microstructure to the student via a graphical user interface of the course consumption platform.

10. The system of claim 1, wherein the course datagraph macrostructure, the lesson datagraph microstructure, and the practice datagraph microstructures are each stored as directed graph structures.

11. The system of claim 4, wherein the prior difficulty level is an initial difficulty level, and wherein the prior knowledge level is an initial knowledge level.

* * * * *